United States Patent [19]

Kishida

[11] Patent Number: 5,055,943
[45] Date of Patent: Oct. 8, 1991

[54] METHOD OF AND APPARATUS FOR RECORDING HALFTONE IMAGE

[75] Inventor: Yoshihiro Kishida, Kyoto, Japan

[73] Assignee: Dainippon Screen Mfg. Co. Ltd., Japan

[21] Appl. No.: 339,078

[22] Filed: Apr. 14, 1989

[30] Foreign Application Priority Data

Apr. 14, 1988 [JP] Japan .................................. 63-92499

[51] Int. Cl.$^5$ .............................................. H04N 1/40
[52] U.S. Cl. .................................... 358/459; 358/456; 358/458; 358/465; 358/466
[58] Field of Search ............... 358/429, 448, 454, 455, 358/456, 457, 458, 459, 462, 463, 464, 465, 466, 75, 296

[56] References Cited

U.S. PATENT DOCUMENTS

| | | | |
|---|---|---|---|
| 3,197,558 | 7/1965 | Ernst | 358/459 |
| 4,644,392 | 2/1987 | Yamada | 358/75 |
| 4,701,811 | 10/1987 | Moriguchi et al. | 358/458 |
| 4,814,886 | 3/1989 | Kuge et al. | 358/457 |
| 4,876,611 | 10/1989 | Fischer et al. | 358/456 |

OTHER PUBLICATIONS

Optical Scanning of Continuous-Tone and Line Documents with Spatial Frequency Separation with Improved Data Handling & Compaction, Schinder et al., vol. 20, No. 12, 5-78.

Primary Examiner—Joseph A. Orsino
Assistant Examiner—Jerome Grant, II
Attorney, Agent, or Firm—Ostrolenk, Faber, Gerb & Soffen

[57] ABSTRACT

An image scanner for producing a halftone image is provided with a halftone signal generator which generates an exposure signal (S) for controlling the exposure duration of a laser beam (L) which beam is focused on a photosensitive material. The halftone signal generator is so constructed that image data (N) is compared with a threshold data (screen pattern data) for each elementary area and the exposure duration for each elementary area is determined mainly according to a difference between the image data and the threshold data. Some of the elementary areas are partially exposed, to an extent which depends on the exposure duration.

17 Claims, 15 Drawing Sheets

SCREEN PATTERN DATA

| 15 | 9 | 5 | 13 |
|---|---|---|---|
| 7 | 4 | 1 | 12 |
| 11 | 3 | 2 | 8 |
| 14 | 6 | 10 | 16 |

P

SCREEN PATTERN DATA

| 225 | 129 | 65 | 193 |
|---|---|---|---|
| 97 | 49 | 1 | 177 |
| 161 | 33 | 17 | 113 |
| 209 | 81 | 145 | 241 |

$A_1$ $A_{241}$

N = 5

N = 15

N = 17

N = 32

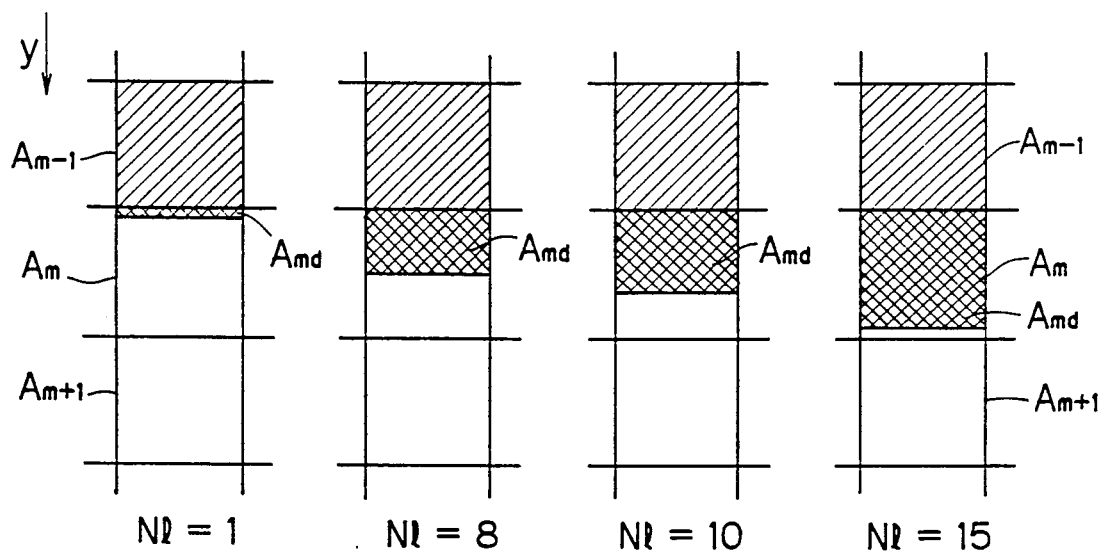
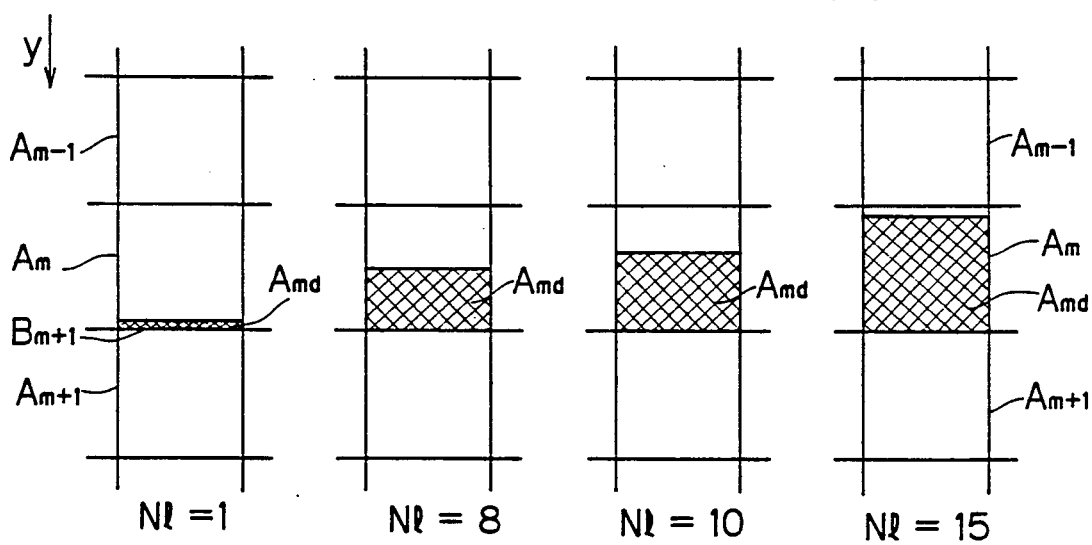

RELATION BETWEEN P AND (Nu+ 1)

| AREA DATA | A65 | A1 | A17 | A145 |
|---|---|---|---|---|
| P | 65 | 1 | 17 | 145 |
| N | 90 | 14 | 60 | 20 |
| Nu+ 1 | 81 | 1 | 49 | 17 |

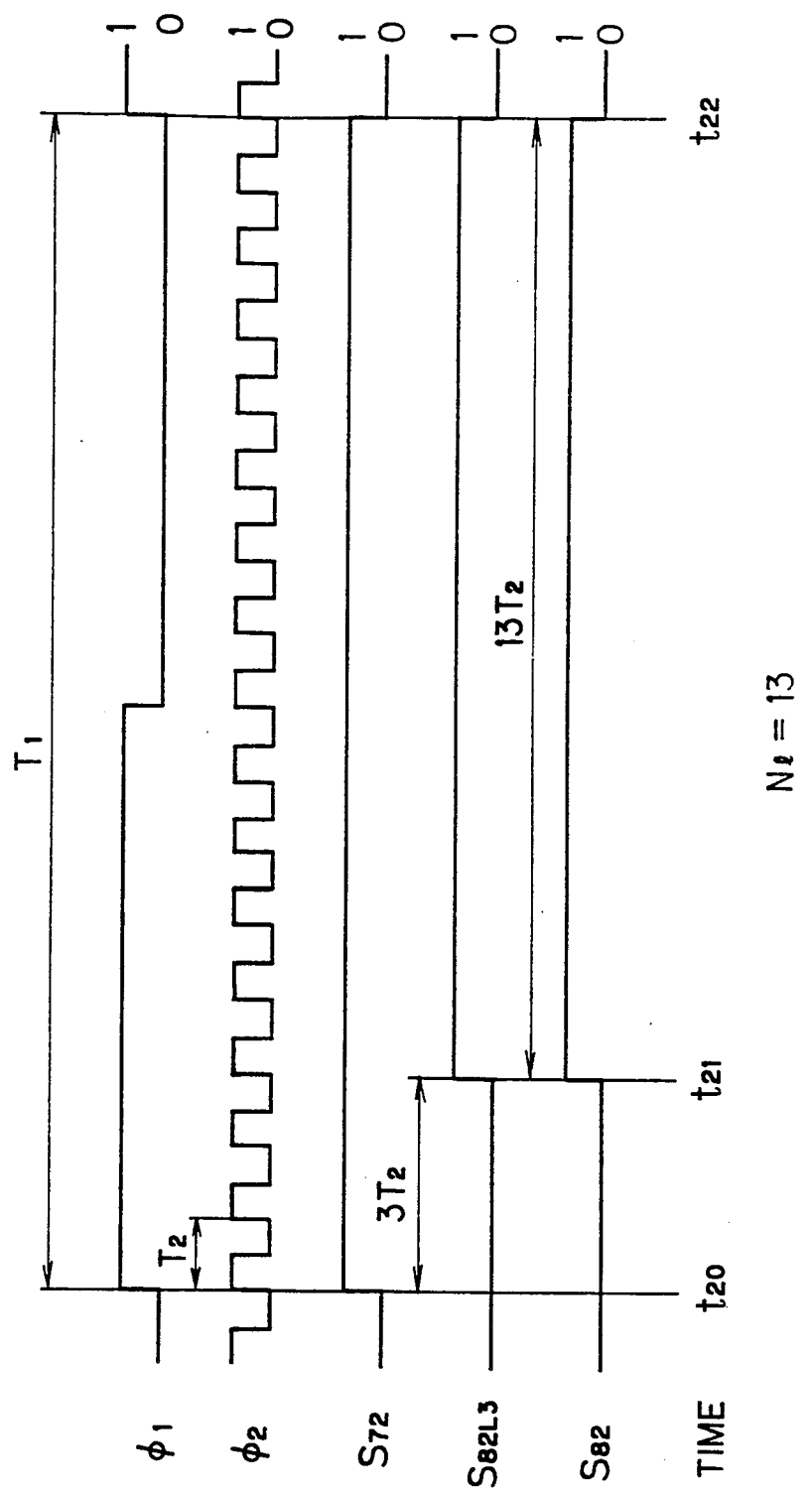

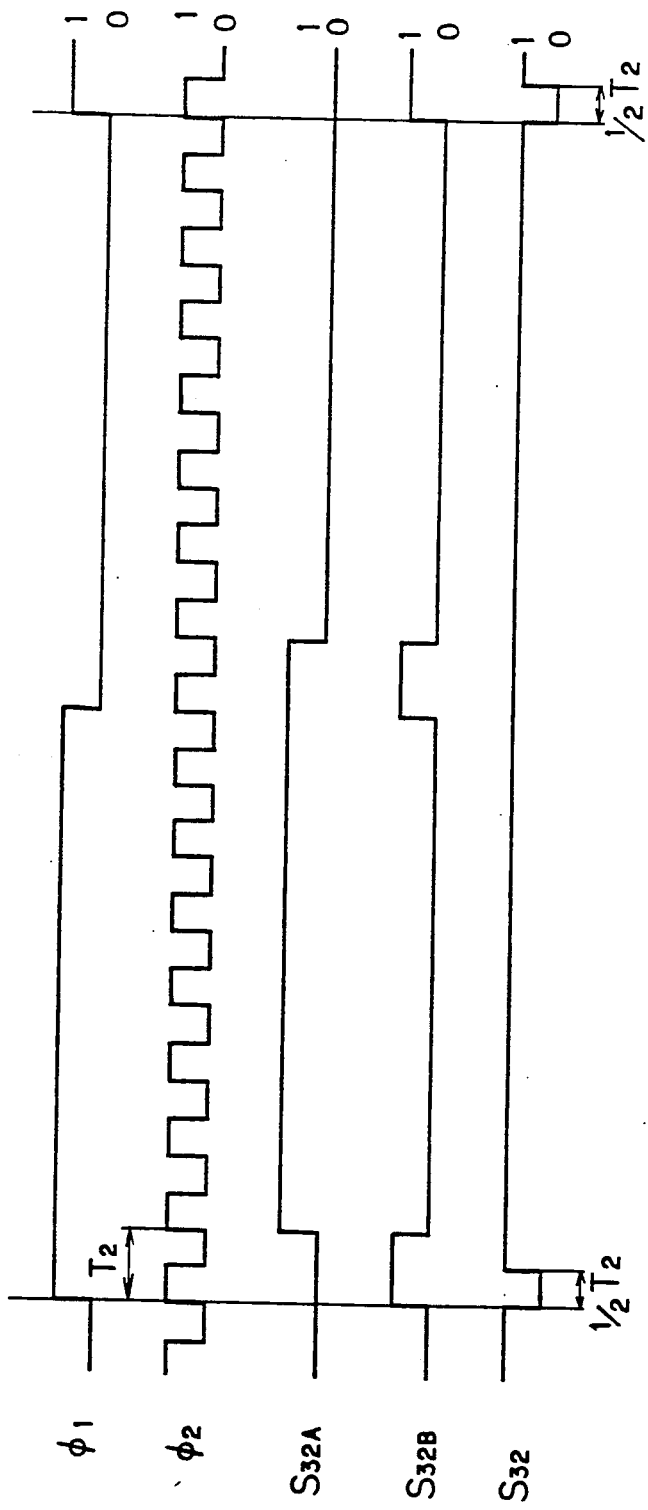

METHOD OF AND APPARATUS FOR RECORDING HALFTONE IMAGE

BACKGROUND OF THE INVENTION

1. Field of the Invention

The present invention relates to technique for substantially improving gradation reproducibility of a halftone image by partially exposing each elementary area which serves as a unit for a value of screen pattern data.

2. Description of the Prior Art

In an apparatus for recording a halftone image such as a graphic arts scanner of the electronic control type, halftone dots are produced by exposing a photosensitive material while turning an optical exposure beam on and off in response to the result of comparison between an image signal to a prescribed screen pattern signal. The screen pattern signal is generated on the basis of screen pattern data prepared in advance.

As is well known in the art, the screen pattern data express threshold values for respective small areas $A_p$ within a halftone dot HD illustrated in FIG. 1. The small areas $A_p$ (hereinafter referred to as "elementary areas") are formed by dividing the halftone dot HD into a matrix of elementary areas. FIG. 2 illustrates screen pattern data prepared for the halftone dot HD and stored in a memory. Numerals in this figure represent data values P assigned to respective elementary areas $A_p$. Referring to FIG. 1, shaded areas have respective screen pattern data P which are at most 12, whereby the shaded areas are exposed with an optical exposure beam when an image signal having a value of 12 is supplied for the halftone dot HD.

The size of the elementary area $A_p$ is determined according to a spot diameter d of the optical exposure beam focused on the photosensitive material. In more concrete terms, the size of the elementary areas $A_p$ is so determined that a value of the spot diameter d is in the range from about "a" (hereinafter referred to as "elementary area size") of one side of each elementary area $A_p$ to about twice of "a". It is to be noted that the spot diameter d is assumed to be equal to the diameter of a circle inscribed in the elementary area $A_p$ in the drawing, for convenience of illustration.

Adjudgement is made as to whether the optical exposure beam is turned on or off for every scanning advance corresponding to the spot diameter d, whereby the intensity of the optical beam is changed in response to the result of the judgement. In the conventional method of recording a halftone image, therefore, a spatial interval which is a unit of the intensity change of the optical beam is limited to integral multiples of the elementary area size a.

Thus, when the relation (1) specified below holds for a square halftone dot having a screen pitch K, a gradation number M defined by the equation (2) (below) is the upper limit of number of levels for gradation expression:

$$K = na \quad (1)$$

$$M = (K/a)^2 = n^2 \quad (2)$$

where n is an integer.

In order to increase the gradation number M, therefore, it is necessary to increase (K/a) in the equation (2). In a scanner of a flat bed type, however, the focal length of an image forming lens in a recording optical system is rather long in order to obtain a desired scanning length. Thus, the spot diameter d of the optical exposure beam cannot be reduced to a desired degree in the flat-bed type scanner. For example, providing a spot diameter of about ten to twenty micrometers poses significant technical difficulties and an inordinate increase in cost. Consequently, it is unavoidable in the flat-bed type scanner that the elementary area size a is relatively increased and the gradation number M is reduced, as is evident from the equation (2).

Also, in a drum type scanner which can employ relatively small valved spot diameter d (and the elementary area size a as the result), the gradation number M is small if the screen pitch K is small.

Thus, in the conventional apparatus for recording a halftone image, the gradation number M remains small when the ratio of the screen pitch K to the elementary area size a cannot be substantially increased, whereby gradation reproducibility of the image remains rather poor.

Even if the spot diameter d of the optical exposure beam can be reduced, the amount of the screen pattern data must be increased in order to increase the gradation number M, and hence a capacity of a screen pattern memory must be increased, which causes a considerable increase in cost.

SUMMARY OF THE INVENTION

The present invention is directed to a method of and an apparatus therefore for producing a halftone image comprising a plurality of halftone dots on a photosensitive material, a full region of one halftone dot being divided into a plurality of unit areas. The method comprises the steps of: (a) preparing image data expressing the density for each unit area on an image plane, (b) preparing threshold data for each unit area on the image plane, (c) comparing the image data with the threshold data for each unit area on the image plane, thereby designating each unit area as a full-exposure area to be entirely exposed, a semi-exposure area to be partially exposed or as a non-exposed area not to be exposed at all, and (d) exposing unit areas on the photosensitive material corresponding to the full-exposure area and the semi-exposure area on the image plane, thereby producing the halftone image, where a ratio of a exposed portion in the semi-exposure area to the entirety of one unit area is determined on the basis of the difference between the image data and the threshold data for the semi-exposure area.

Preferably, the photosensitive material is exposed with a light beam which scan the halftone image at a prescribed speed, and the size of the exposed portion of the semi-exposure area is controlled by adjusting exposure time in the semi-exposure area in proportion to the ratio.

The threshold data may be formed as a set of threshold values assigned for respective unit areas included in the full region of one halftone dot, where the threshold values are arranged into an arithmetic sequence of numbers having a prescribed numerical interval.

The image data and the threshold data may be a digital data consisting of a same number of bits.

According to an aspect of the present invention, the step (c) further comprises the step of: (c-1) finding which of the image data and the threshold data is larger, to thereby designate the unit area as the non-exposure area or as an exposure area to be exposed, (c-2) finding a value substantially expressing the difference between the image data and the threshold data for each unit area, and (c-3) designating the exposure area as the full-exposure area when the difference is outside a prescribed range, or as the semi-exposure area when the difference is within the prescribed range.

The exposed portion of the semi-exposure area may contact a boundary between the semi-exposure area and a neighbor unit area neighboring the semi-exposure area, where the neighbor unit area corresponds to the exposure area.

An object of the present invention is to provide a method of and an apparatus for recording a halftone image, where gradation reproducibility of a recorded image is substantially improved without reducing the ratio of a screen pitch to a spot diameter of an optical exposure beam and without increasing the capacity of a screen pattern memory.

These and other objects, features, aspects and advantages of the present invention will become more apparent from the following detailed description of the present invention when taken in conjuction with the accompanying drawings.

BRIEF DESCRIPTION OF THE DRAWINGS

FIGS. 5A to 5D, 6A to 6D, 7A-7D and 9 are diagrams which schematically show methods of exposure according to the present invention;

FIGS. 14, 15A to 15C and 16 are timing charts showing the operation of the embodiment of the present invention.

DESCRIPTION OF THE PREFERRED EMBODIMENT

The basic idea of the present invention will be first described with reference to some examples.

As to exposed portions (shown as shaded areas) of a halftone dot HD shown in FIG. 1, elementary area (or pixel) $A_p$ thereof is exposed when a value of screen pattern data P for the elementary area $A_p$ is not greater than a value of an image data N, as shown in the following equation (3):

Exposure condition:

$$P \leq N \quad (3)$$

Figures 1, 2, 3:
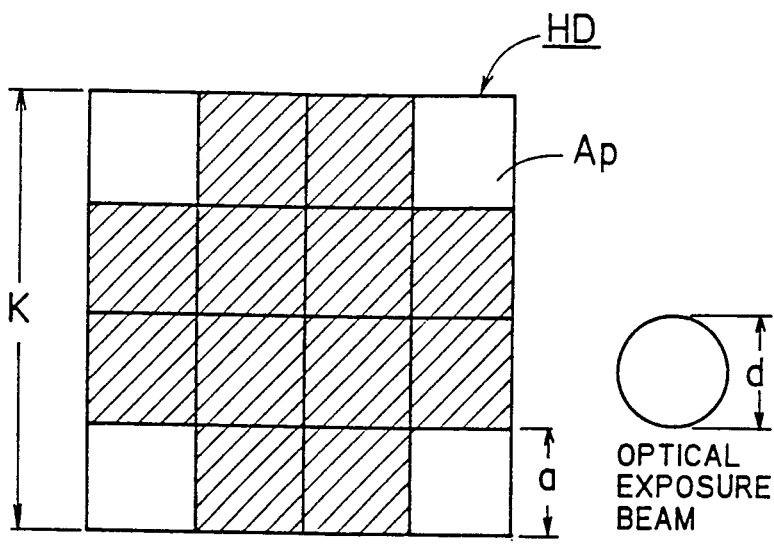
FIG. 1 is a diagram showing a halftone dot.
FIGS. 2 and 3 are diagrams showing screen pattern data for the halftone dot.

For the purpose of simplification, it is assumed that both the screen pattern data P and the image data N are 8-bit digital signals and the screen pattern data P are set as shown in FIG. 3 for the halftone dot HD. In other words, the image data N, which express the density for each elementary area, are within a range of zero to 255 in decimal notation, and can express 256 gradation levels. On the other hand, one halftone dot HD has 16 elementary areas (or pixels) $A_p$, and the screen pattern data P discriminates only 16 gradation levels, although it is expressed in 8-bit data words.

An i-th bit value of the image data N, where i is an integer, is expressed as $n_i$. The image data N, more significant bit data (MSBD) $N_u$ and less significant bit data (LSBD) $N_l$ are defined as follows in binary notation:

$$N = n_8 n_7 n_6 n_5 n_4 n_3 n_2 n_1 \quad (4)$$

$$N_u = n_8 n_7 n_6 n_5 0000 \quad (5)$$

$$N_l = 0000 n_4 n_3 n_2 n_1 \quad (6)$$

where $n_1$ through $n_8$ represent a 1 or a 0: as the case may be

The MSBD $N_u$ is obtained by neglecting four low significant bits of the image data N and the LSBD $N_l$ is composed of only the four least significant bits.

The number of effective bits (=4) of the MSBD $N_u$ is determined so that the MSBD $N_u$ can express the number of gradation levels ($2^4 = 16$) which is identical to the number of levels of the screen pattern data P. The LSBD $N_l$ is obtained by subtracting the MSBD $N_u$ from the image data N.

When either of the following conditions holds for the elementary area $A_p$ in which the exposure condition expressed by the equation (3) is satisfied, only a portion of the elementary area $A_p$ is exposed:

Divisional Exposure Condition C-1:

$$P = N_u + 1 \text{ and } N \leq 240 \quad (7)$$

Divisional Exposure Condition C-2:

$$P = N_u + 1 \text{ and } 240 < N \leq 255 \quad (8)$$

In the equations (7) and (8), the values of the screen pattern data P, the image data N and the MSBD $N_u$ are supposed to be expressed in decimal numbers; The part of the elementary areas $A_p$ which is to be exposed is decided in accordance with the LSBD N. One elementary area $A_p$ is divided into unit portions to be exposed on a controlled discriminatively basis. The number of the unit portions is referred to as "dividing number D".

The relation among the image data N, the screen pattern data P, the gradation number M and the dividing number D will be described below.

Assuming that $G_N$ represents the gradation number (or number of gradation levels) of the image data N, the dividing number D of the elementary area $A_p$ is so decided that the following relation holds between the halftone dot gradation number M and the dividing number D:

$$G_N = M \times D \quad (9)$$

$G_N = 256$, M = 16 and D = 16 in the above example.

The number of digit of MSBD $N_u$ are so determined that it can express the same gradation number ($=2^4$) as the halftone dot gradation number M. Therefore, the gradation number $G_N$ of the image data N can be expressed by a combination of the halftone dot gradation number M and the dividing number D if the dividing number D corresponds to the gradation number ($=2^4$) of the LSBD $N_l$. The screen pattern data P are threshold values for classifying all the image data N into a certain number of groups, which number is identical to the halftone dot gradation number M.

For example, Table 1 shows the screen pattern data P of FIG. 3, expressed in both decimal and binary numbers.

TABLE 1

| Screen Pattern Data P | |
|---|---|
| Decimal Number | Binary Number |
| 1 | 0 0 0 0 0 0 0 1 |
| 17 | 0 0 0 1 0 0 0 1 |
| 33 | 0 0 1 0 0 0 0 1 |
| . | . |
| . | . |
| 241 | 1 1 1 1 0 0 0 1 |

The screen pattern data P are expressed in eight bits, as are the image data N, and obtained by adding "1" to respective fifth bit values (least significant bit values within the four more significant bit values) in binary notation. The least significant bits of the screen pattern data P are regularly "1" and the second to fourth bit values are regularly "0".

As the result of such structure of a screen pattern data P, at least one screen pattern data P is present, in which the equality in the equation (7) or (8) holds for any image data N.

FIGS. 4A to 4D are diagrams which processing in each case of the two divisional exposure conditions C-1 and C-2. In the following description, it is assumed that the screen pattern data P, the image data N, MSBD $N_u$ and the LSBD $N_l$ are expressed in decimal numbers.

Figure 4A:
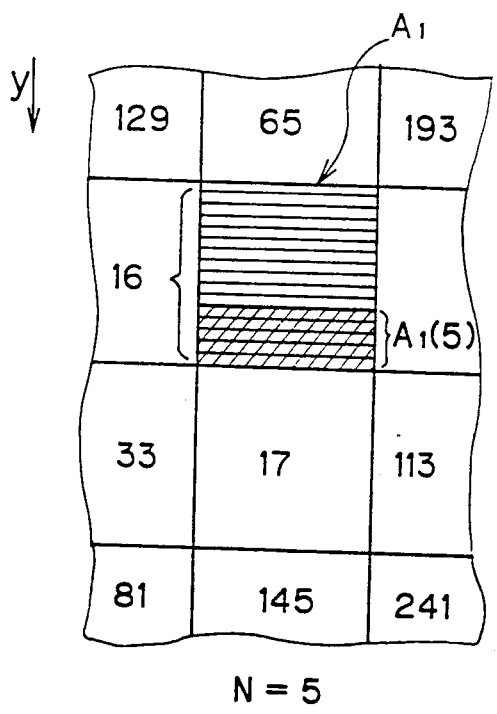
FIGS. 4A to 4D illustrate processing corresponding to several exposure conditions for a preferred embodiment of the present invention.

In the case of N=5, an elementary area $A_1$ (see FIG. 3) is subjected to exposure, because the exposure condition of the equation (3) is met for the elementary area $A_1$. Since $N_u+1=1$ in this case, the divisional exposure condition C-1 (above equation (7)) is also met for the elementary area $A_1$. FIG. 4A is a partially enlarged view of FIG. 3, for illustrating the state of divisional exposure of the elementary area $A_1$. As shown in FIG. 4A, the elementary area $A_1$ is divided into 16 (the dividing number D=16) along a main scanning direction y, to be exposed stepwise, in steps of $N_l/16$. When the image data N is 5, the LSBD $N_l$ is also 5. Therefore, only a portion $A_1$ (5) which is 5/16 of the elementary area $A_1$ is exposed as shown as shaded area with slanting lines in FIG. 4A.

Figure 4B:
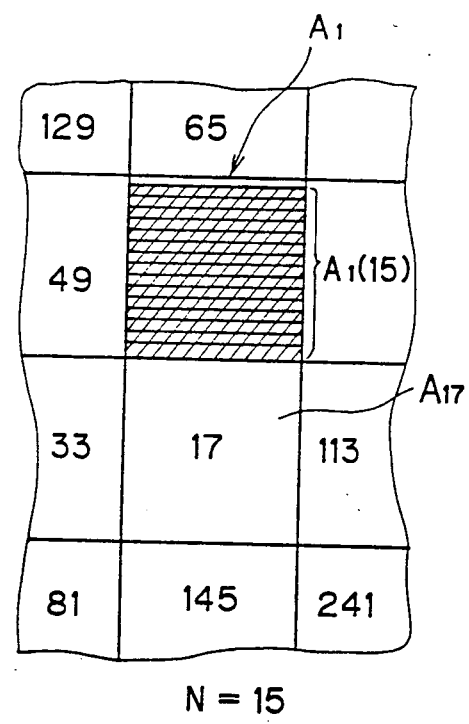

FIG. 4B shows the case of N=15. $N_u+1=1$ holds also in this case, and hence divisional, i.e. stepwise or partial, exposure is performed on the elementary area $A_1$, as above. As shown by shaded area with slanting lines in FIG. 4B, only a portion $A_1$ (15) which is 15/16 of the elementary area $A_1$ is exposed.

Also in the case of N=16, the elementary area $A_1$ is subjected to exposure because the condition called for by equation (3) is met. However, the equation (7) is not satisfied because $N_u+1=17$, and hence divisional exposure is not performed on the elementary area $A_1$, but the same is entirely exposed. Other elementary areas other than the elementary area $A_1$ are not exposed since the equation (3) does not hold for them. Looking at it differently an, elementary area $A_{17}$ is subjected to divisional exposure because $N_u+1=17$, and it is exposed at the rate of 0/16 because $N_l=0$.

Figure 4C:
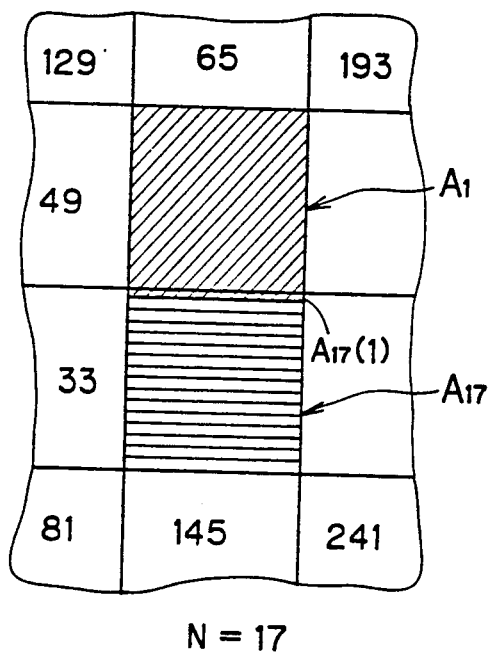

FIG. 4C shows the case of N=17. In this case the elementary areas $A_1$ and $A_{17}$ are subjected to exposure, because the equation (3) is satisfied there. The elementary area $A_{17}$ is partially exposed because $N_u+1=17$, while the elementary area $A_1$ is entirely exposed. A portion $A_{17}$(1) which is 1/16 of the elementary area $A_{17}$ is exposed as shown in FIG. 4C, because $N_l=1$.

Figure 4D:
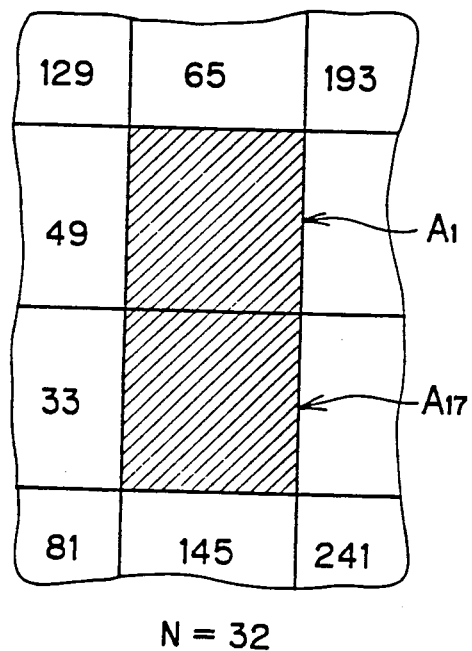

FIG. 4D shows the case of N=32. In this case, the elementary areas $A_1$ and $A_{17}$ are subjected to exposure according to the equation (3), and no partial exposure is performed because $N_u+1=33$. Thus, the elementary areas $A_1$ and $A_{17}$ are entirely exposed as shown in FIG. 4D.

As described above, whether or not each elementary area $A_p$ is subjected to exposure is determined on the basis of the exposure condition of the equation (3). Further, the elementary areas to be partially exposed (hereinafter referred to as "divisional exposure areas") are determined on the basis of the divisional exposure condition C-1 of the equation (7), while the rate of exposure is determined by the LSBD $N_l$. As the result, the size of exposed areas is increased in proportion to the image data N, whereby the reproduction gradation number becomes identical to the gradation number of the image data N.

Sequence of processing along the conditions of the equations (3) and (7) may be inverted. That is, judgement may be first made as to whether or not divisional exposure is preformed along the condition of the equation (7) with the image data N, whereby a portion of an elementary area to be partially exposed is determined by the LSBD $N_l$. Then, judgement may be made on the other elementary areas not to be so exposed as to whether or not the same are entirely exposed according to the condition of the equation (3). For example, the elementary area $A_1$ is partially exposed when N=0, since $N_u+1=1$. However, the rate of exposure is 0/16 since N=0, and hence the elementary area $A_1$ is not exposed as a result. Thus, the same result is obtained whichever condition of the equations (3) and (7) is considered first.

Figure 5A:
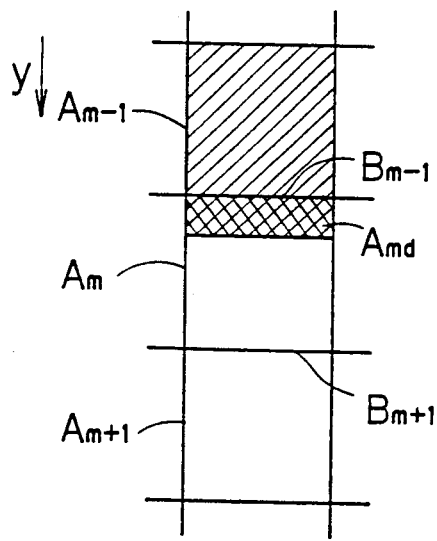

In the case of the divisional exposure condition C-1, the image data N and the screen pattern data P are compared to each other with respect to the elementary areas $A_1$ to $A_{225}$ in the halftone dot HD as hereinabove described, whereby some portions of the respective elementary areas are exposed. Further, it is desirable that the exposed portions are linked with the exposed portions of adjacent elementary areas, in order to form a halftone dot of excellent quality. Therefore, the position of an exposed portion in a partial exposure area is decided in consideration of exposure states of adjacent elementary areas, as follows:

FIGS. 5A to 5D are explanatory diagrams illustrating a method of deciding the position of an exposed portion of a divisional exposure area. Referring to FIG. 5A, symbols $B_{m-1}$ and $B_{m+1}$ denote boundaries between a divisional exposure area $A_m$ and two elementary areas $A_{m-1}$ and $A_{m+1}$ which are adjacent to it along the main scanning direction y, respectively. There are four combinations of exposure states for respective elementary areas $A_{m-1}$ and $A_{m+1}$. The exposed portion of the divisional exposure area $A_m$ is located at either of the boundaries $B_{m-1}$ and $B_{m+1}$ in response to the combination, as shown in Table 2.

TABLE 2

| Case | Exposure State | | Boundary Contacting Exposed Portion |
|---|---|---|---|
| | $A_{m-1}$ | $A_{m+1}$ | |
| 1 | 1 | 0 | $B_{m-1}$ |
| 2 | 1 | 1 | $B_{m-1}$ |
| 3 | 0 | 0 | $B_{m+1}$ |

TABLE 2-continued

| | Exposure State | | Boundary Contacting |
|---|---|---|---|
| Case | $A_{m-1}$ | $A_{m+1}$ | Exposed Portion |
| 4 | 0 | 1 | $B_{m+1}$ |

Referring to Table 2, the exposure state "0" indicates that the elementary area is not exposed and the exposure state "1" indicates that it is exposed. The exposure state "1" also includes divisional exposure of the elementary area. These exposure states are judged through the above equation (3), so that the exposure state "1" is selected when the equation (3) is satisfied while the exposure state "0" is selected when the equation (3) is not satisified.

Figure 5B:
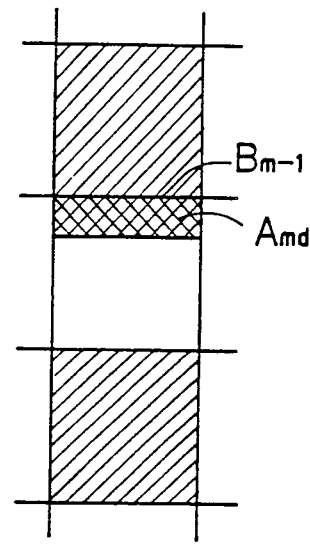

When the adjacent elementary area $A_{m-1}$ is exposed, an exposed portion (hereinafter referred to as "divisional exposure portion") $A_{md}$ of the divisional exposure area $A_m$ is formed to be in contact with the boundary $B_{m-1}$, as shown in case 1 and case 2 of Table 2. FIGS. 5A and 5B show divisional exposure states corresponding to the case 1 and the case 2, respectively.

FIGS. 6A to 6D shows the states of divisional exposure corresponding to the case 1 and the case 2 in detail. FIGS. 6A to 6D correspond to the cases where the less significant bit data (LSBD) $N_1$ are 1, 8, 10 and 15, respectively. When the LSBD $N_1$ is increased, the divisional exposure portion $A_{md}$ is increased in the direction (+y) from the boundary $B_{m-1}$. Thus, the divisional exposure portion $A_{md}$ is exposed to normally contact the adjacent elementary area $A_{m+1}$ in the case 1 and the case 2 of Table 2. This condition is hereafter referred to as "divisional exposure condition C-1$a$".

Figure 5C:
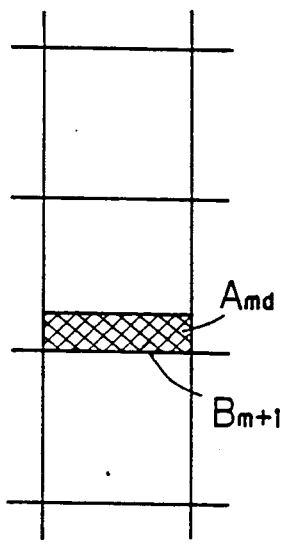
Figure 5D:
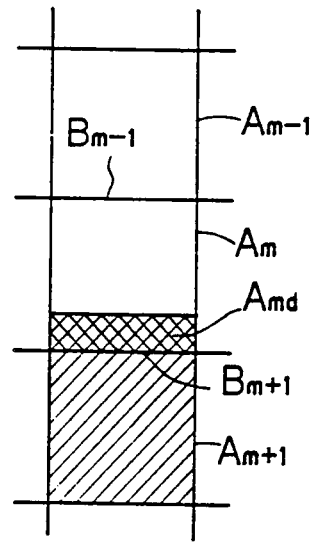

When the adjacent elementary area $A_{m-1}$ is not exposed as shown in the case 3 and the case 4 in Table 2, on the other hand, the divisional exposure portion $A_{md}$ is formed to be in contact with the boundary $B_{m+1}$. FIGS. 5C and 5D show divisional exposure states in the case 3 and the case 4, respectively.

FIGS. 7A to 7D shows the states of divisional exposure of the case 3 and the case 4 in detail. FIGS. 7A to 7D correspond to the cases where the LSBD $N_1$ are 1, 8, 10 and 15, respectively. When the LSBD $N_1$ is increased, the divisional exposure portion $A_{md}$ is increased in the direction (−y) from the boundary $B_{m+1}$. Thus, the divisional exposure portion $A_{md}$ is exposed to normally contact the adjacent elementary area $A_{m+1}$ in the case 3 and the case 4 of Table 2. This condition is hereafter referred to as "divisional exposure condition C-1$b$".

As described above the divisional exposure portion $A_{md}$ is linked with the exposed portion of the elementary area which is adjacent to the divisional exposure area $A_m$ by performing divisional exposure in accordance with the divisional exposure condition C-1$a$ or C-1$b$, thereby to form a halftone dot of excellent configuration, in the regions where exposed portions contact each other.

The divisional exposure condition C-2 expressed by the equation (8) denotes the case where the image data N are in a range of $240 < N(d) \leq 255$ and is independently treated. The image data N of this range designates an elementary area $A_{241}$ to be exposed, while the number of gradation levels of the image data N (=241 to 255) in this range is 15, unlike to the gradation number 16 of the image data N corresponding to other elementary areas. Thus, the image data N in the range (N=241 to 255) is treated differently from to those in other ranges in performing divisional exposure.

Figure 8:
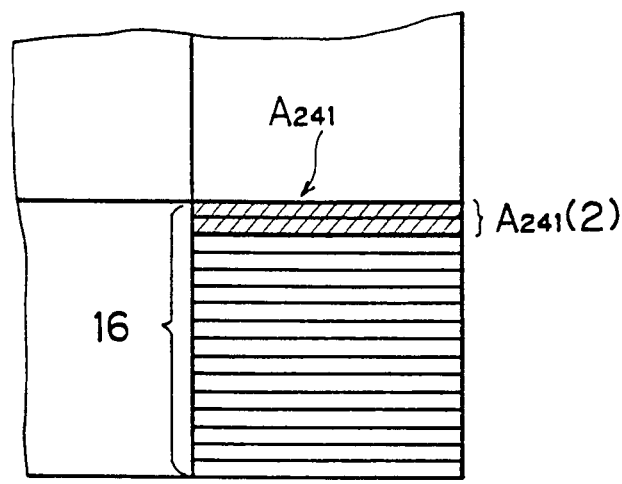

Consider the case where the dividing number of the elementary area $A_{241}$ is 16, as in the other elementary areas. FIG. 8 is an explanatory, enlarged diagram showing the elementary area $A_{241}$, divided into 16. The LSBD $N_1$ corresponding to the maximum value $N_{max}$ (=255) of the image data N is 15. Hence the elementary area $A_{241}$ is exposed only at the rate of 15/16 in response to the maximum value $N_{max}$ when divisional exposure is performed similarly to the divisional exposure condition C-1. A problem is therefore presented because the halftone area rate is not 100% even for the maximum value $N_{max}$.

In order to solve this problem, $(N_1+1)/16$ of the elementary area $A_{241}$ is exposed in response to the LSBD $N_1$ when the divisional exposure condition C-2 holds. When N=241, i.e., $N_1=1$, for example, a portion $A_{241}(2)$, which is 2/16 of the elementary area $A_{241}$, is divisionally exposed, as shown in FIG. 8. Thus, the entire elementary area $A_{241}$ is exposed when N=255.

Figure 10:
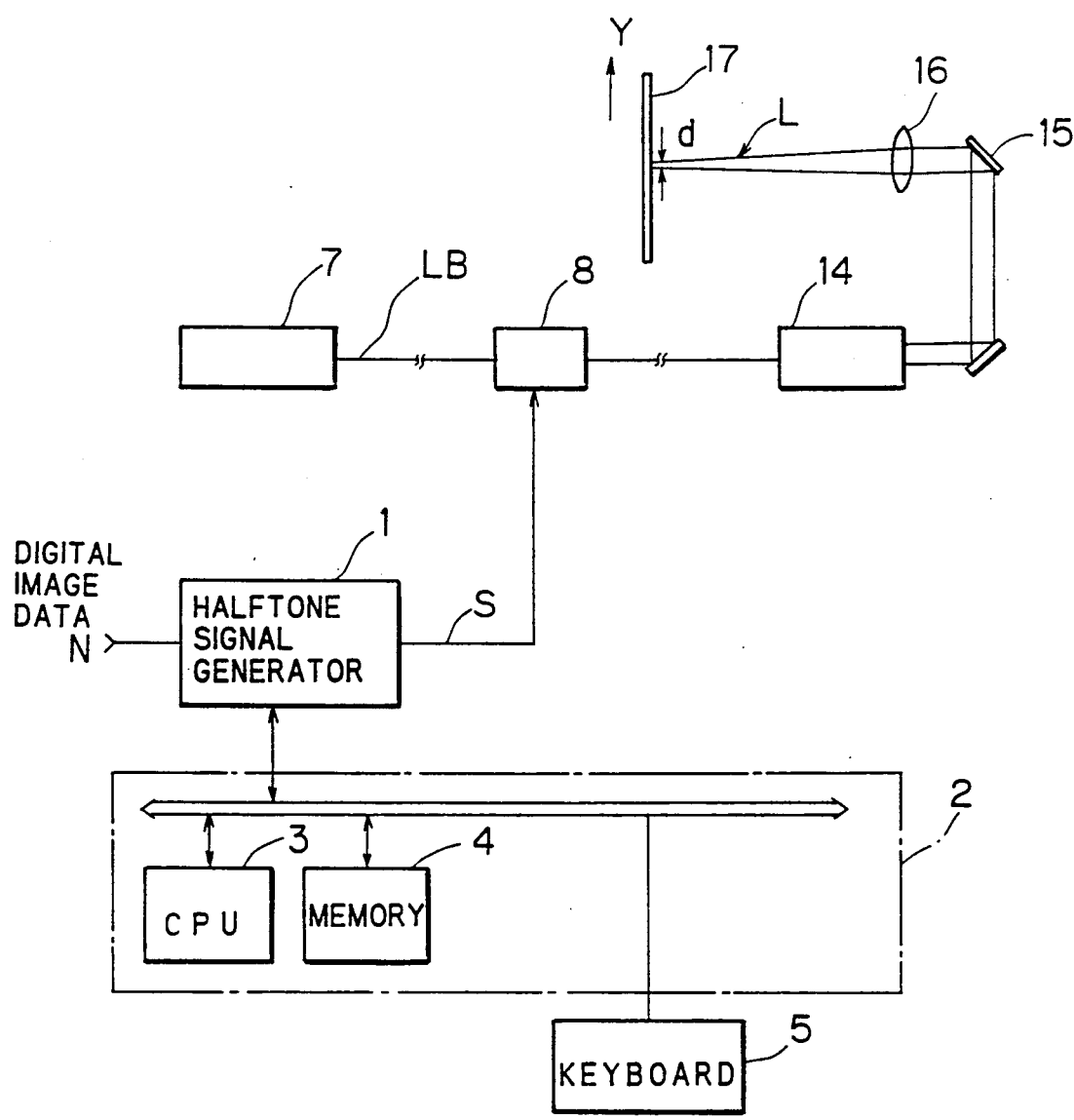
FIG. 10 is a block diagram showing an apparatus according to the preferred embodiment of the present invention.

FIG. 10 shows the structure of a graphic arts scanner of a flat bed type in which the present invention can be incorporated.

Referring to FIG. 10, digital image data N including image information to be recorded are inputted in a halftone signal generator 1, the structure of which will be described in detail. The halftone signal generator 1 generates an exposure signal S on the basis of the digital image data N which is inputted into the generator for every elementary area, sequentially along scanning lines. The exposure signal S controls formation of halftone dots. A microcomputer 2 responsible for operational control is connected to the halftone signal generator 1. The microcomputer 2 includes a CPU 3 and a memory 4, and is connected to a keyboard 5 for inputting control parameters.

A laser beam L is generated in a laser oscillator 7, which serves as a light source for an exposure beam. The laser beam L is modulated in an acoustic optical modulator (AOM) 8 in response to the exposure signal S, then introduced into a beam expander 14. A laser beam L outputted from the beam expander 14 reaches a galvano mirror (or polygonal rotating mirror) 15 by which it is deflected for producing of an object. The beam L is focused onto the surface of a photosensitive material 17 through an f$\theta$ lens 16.

The laser beam L is periodically and repeatedly moved in a direction Y in response to vibration of the galvano mirror 15, or rotation of the polygonal rotating mirror provided in place of the galvano mirror 15, to thereby move along a main scanning direction. The photosensitive material 17 is moved in a direction perpendicular to the plane of the figure, to thereby move along a subscanning direction. Consequently, the photosensitive material 17 is scanned and exposed along the main scanning and subscanning directions, whereby a halftone image corresponding to the digital image data N is recorded on the photosensitive material 17.

Figure 9:
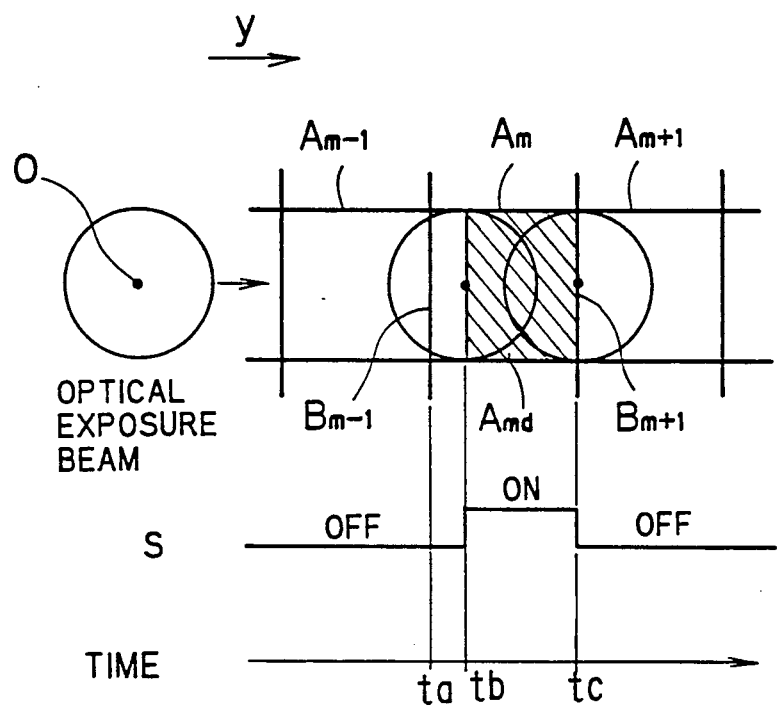

In this apparatus, partial exposure of elementary areas is controlled as follows, for example. FIG. 9 is an explanatory diagram showing exposure control of the divisional exposure portion $A_{md}$. Referring to FIG. 9, scanning of an optical exposure beam is made along the main scanning direction y, in order to expose the divisional exposure portion $A_{md}$ in the elementary area $A_m$ within the elementary areas $A_{m-1}$ to $A_{m+1}$. The main scanning direction y is horizontal in this figure, for convenience of illustration. An exposure signal S assumes an ON state during an interval between times $t_b$ and $t_c$, at which a center O of the optical exposure beam reaches respective ends of the divisional exposure portion $A_{md}$. As a result, the divisional exposure portion $A_{md}$ is photosensitized by receiving light in an amount exceeding critical exposure of the photosensitive material, while other portions are not photosensitized. The optical exposure beam is thus controlled to form a recording image in which the divisional exposure portion $A_{md}$ as a part of the elementary area $A_m$ is photosensitized. Although the shape of the photosensitized area is not actually completely rectangular as shown in FIG. 9, from a practical standpoint exposure of the divisional exposure poriton $A_{md}$ is substantially achieved because the interval for keeping the exposure beam at an ON state is proportional to the photosensitized area.

In order to expose the entire elementary area $A_m$, an ON state is maintained during an interval between times $t_a$ and $t_c$, at which the center O of the optical exposure beam reaches respective positions of the boundaries $B_{m-1}$ and $B_{m+1}$.

Now, the structure and operation of the halftone signal generator 1 will be described in more detail.

Figure 11A:
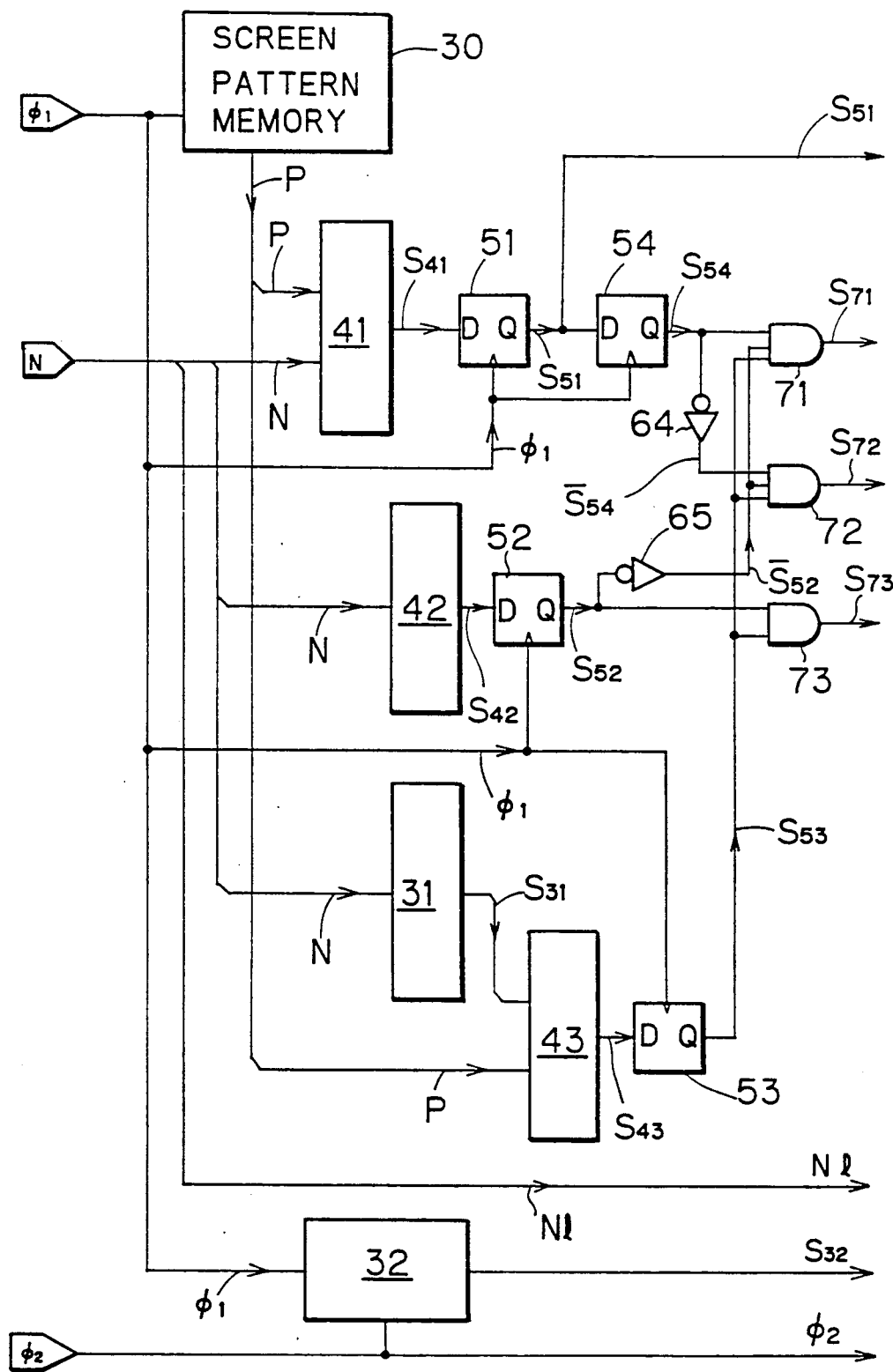
FIGS. 11A, 11B, 12 and 13A to 13C are block diagrams showing the internal structure of a halftone dot generator in the embodiment of the present invention.
Figure 11B:
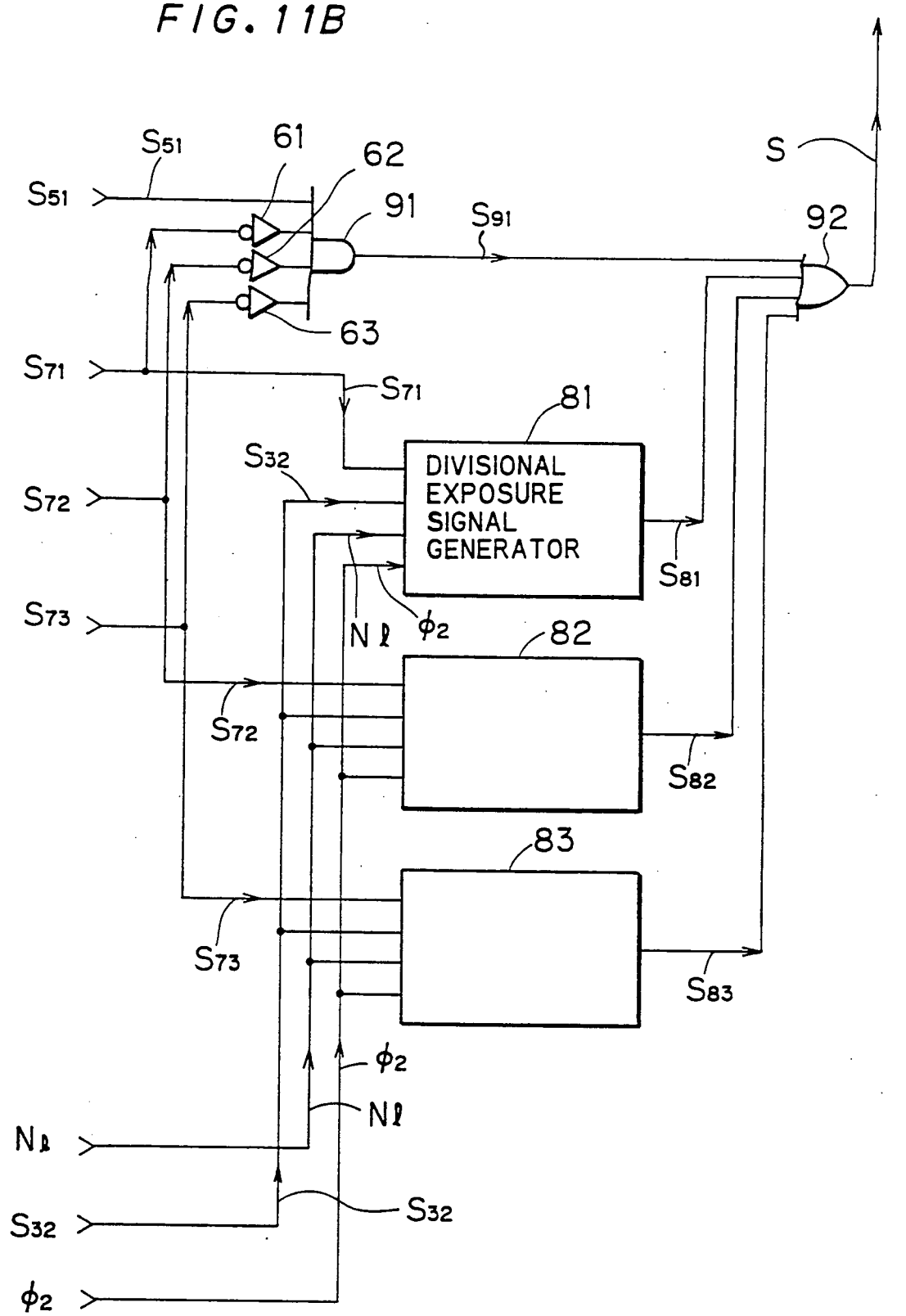

FIGS. 11A and 11B illustrate the internal structure of the halftone signal generator 1. Referring to FIG. 11A, the digital image data N inputted sequentially for respective elementary areas are supplied each of comparators 41 and 42 and an adder 31.

The screen pattern data P for respective elementary areas are also sequentially inputted in the comparator 41 from a screen pattern memory 30. The screen pattern data P are outputted from the screen pattern memory 30 in synchronism with a first clock signal $\phi_1$, which is inputted into the memory 30. The first clock signal $\phi_1$ has a cycle (one clock cycle) which corresponds to the width a (see FIG. 1) of the image, and the image data N are also inputted into the halftone signal generator 1 in synchronism with the first clock signal $\phi_1$. Thus, the image data N and the screen pattern data P are synchronously and sequentially inputted into the comparator 41 for respective elementary areas.

The comparator 41 compares the values of the image data N to the screen pattern data P, to generate a signal $S_{41}$ which has a "1" level when $P \leq N$ and a "0" level when $N < P$. In other words, the comparator 41 judges whether or not the exposure condition of the equation (3) is satisfied, and outputs a "1" level signal when it is satisfied.

This output signal $S_{41}$ is sequentially latched by D flip-flops 51 and 54 on the leading edge of the first clock signal $\phi_1$. Namely, the output signal $S_{54}$ of the flip-flop 54 is the same as the output signal $S_{51}$ of the flip-flop 51 but is delayed by one clock cycle. Assuming that symbols $S_{51}(m)$ and $S_{54}(m)$ represent the signals $S_{51}$ and $S_{54}$ relating to an m-th elementary area $A_m$ in general, the flip-flop 54 latches a signal $S_{54}(m-1)$ relating to an $(m-1)$-th elementary area at the time when the flip-flop 51 latches the signal $S_{51}(m)$ relating to the m-th elementary area $A_m$.

As the result, the output signals $S_{51}(m)$ and $S_{54}(m)$ relating to the image data N of the m-th elementary area $A_m$ are formed as follows:

$$\left. \begin{array}{l} \text{When } P \leq N, \\ S_{51}(m) = 1 \text{ and } S_{54}(m) = 1 \\ \text{When } N < P, \\ S_{51}(m) = 0 \text{ and } S_{54}(m) = 0 \end{array} \right\} \quad (10)$$

The comparator 42 outputs a signal $S_{42}$, which becomes a "1" when the image data N satisfies the relation of $240 < N$ and a "0" when $N \leq 240$. In other words, the comparator 42 determines which one of the divisional exposure conditions C-1 and C-2 (see the above equations (7) and (8)) applicable.

This output signal $S_{42}$ is latched in the flip-flop 52 in synchronism with the first clock signal $\phi_1$, to become a signal $S_{52}$ which is synchronous with the output signal $S_{51}$ of the flip-flop 51. Therefore, an output signal $S_{52}(m)$ relating to the image data N of the m-th elementary area $A_m$ is formed as follows:

$$\left. \begin{array}{l} \text{When } 240 < N, S_{52}(m) = 1 \\ \text{When } N \leq 240, S_{52}(m) = 0 \end{array} \right\} \quad (11)$$

The adder 31 generates a signal $S_{31}$, which is obtained by adding "1" to the MSBD $N_u$ of the image data N, and this output signal $S_{31}$ is supplied to the comparator 43. The screen pattern data P from the screen pattern memory 30 are inputted into the comparator 43, to be compared with the signal $S_{31}$. An output signal $S_{43}$ of the comparator is "1" when $P = N_u + 1$ holds. In other words, the comparator 43 judges whether or not either of the divisional exposure condition C-1 or C-2 holds.

The output signal $S_{43}$ is latched in the flip-flop 53 in synchronism with the first clock signal $\phi_1$, to become a signal $S_{53}$ which is synchronous with the signals $S_{51}$ and $S_{52}$. Therefore, an output signal $S_{53}(m)$ with respect to the image data N of the m-th elementary area $A_m$ is formed as follows:

$$\left. \begin{array}{l} \text{When } P = N_u + 1, S_{53}(m) = 1 \\ \text{When } P \neq N_u + 1, S_{53}(m) = 0 \end{array} \right\} \quad (12)$$

The output signals $S_{52}$, $S_{53}$ and $S_{54}$ thus obtained are inputted in three AND gates 71, 72 and 73 in the following manner, whereby divisional exposure areas are detected and the exposure condition is evaluated:

First, the signals $S_{53}$ and $S_{54}$ and an inverted signal $\overline{S_{52}}$ of the signal $S_{52}$ obtained in an inverter 65 are inputted in the AND gate 71. Assuming that the signals $\overline{S_{52}}$ and $S_{53}$ are signals $\overline{S_{52}}(m)$ and $S_{53}(m)$ with respect to the m-th elementary area $A_m$ respectively, the signal $S_{54}$ which is synchronous with them is a signal $S_{54}(m-1)$ for the elementary area $A_{m-1}$.

Therefore, from the equations (10) to (12), an output signal $S_{71}$ of the AND gate 71 assumes a "1" level under the following conditions:

$$\left. \begin{array}{l} S_{71} = 1 \text{ under the condition of:} \\ P \leq N \text{ as to } A_{m-1}, \text{ and} \\ P = N_u + 1 \text{ and } N < 240 \text{ as to } A_m \end{array} \right\} \quad (13)$$

In other words, the AND gate 71 outputs the signal $S_{71}$ at a "1" level when the elementary area $A_m$ satisfies the divisional exposure condition C-1a (the case 1 or 2 in Table 2).

Similarly, the signals $\overline{S_{52}}$ and $S_{53}$, and an inverted signal $\overline{S_{54}}$ of the signal $S_{54}$ obtained in an inverter 64 are inputted in the AND gate 72, and hence an output signal $S_{72}$ thereof becomes a "1" level under the following condition:

$$S_{72} = 1 \text{ under the further condition that:} \\ N < P \text{ as to } A_{m-1}, \text{ and} \\ P = N_u + 1 \text{ and } N \leq 240 \text{ as to } A_m \quad (14)$$

In other words, the AND gate 72 outputs the signal $S_{72}$ of a "1" level when the elementary area $A_m$ satisfies the divisional exposure condition C-1b (the case 3 or 4 in Table 2).

The signals $S_{52}$ and $S_{53}$ are inputted in the AND gate 73, and hence an output signal $S_{73}$ thereof attains a "1" level under the following condition:

$$S_{73} = 1 \text{ under the further condition that:} \\ P = N_u + 1 \text{ and } 240 < N \text{ as to } A_m \quad (15)$$

In other words, the AND gate 73 outputs the signal $S_{73}$ at a "1" level when the elementary area $A_m$ satisfies the divisional exposure condition C-2.

As can be understood from the above description, the adder 31, the comparators 41 to 43, the flip-flops 51 to 54, the inverters 64 and 65, the AND gates 71 to 73, etc. form comparator means for comparing the image data N with the screen pattern data P with respect to the elementary area $A_m$ while generating a signal for divisional exposure indicating that the elementary area $A_m$ is to be subjected to divisional exposure when any one of the conditions of the equations (13) to (15) holds.

Next, the judging operation of the divisional exposure conditions through the comparator means will be described in more detail.

Figure 14:
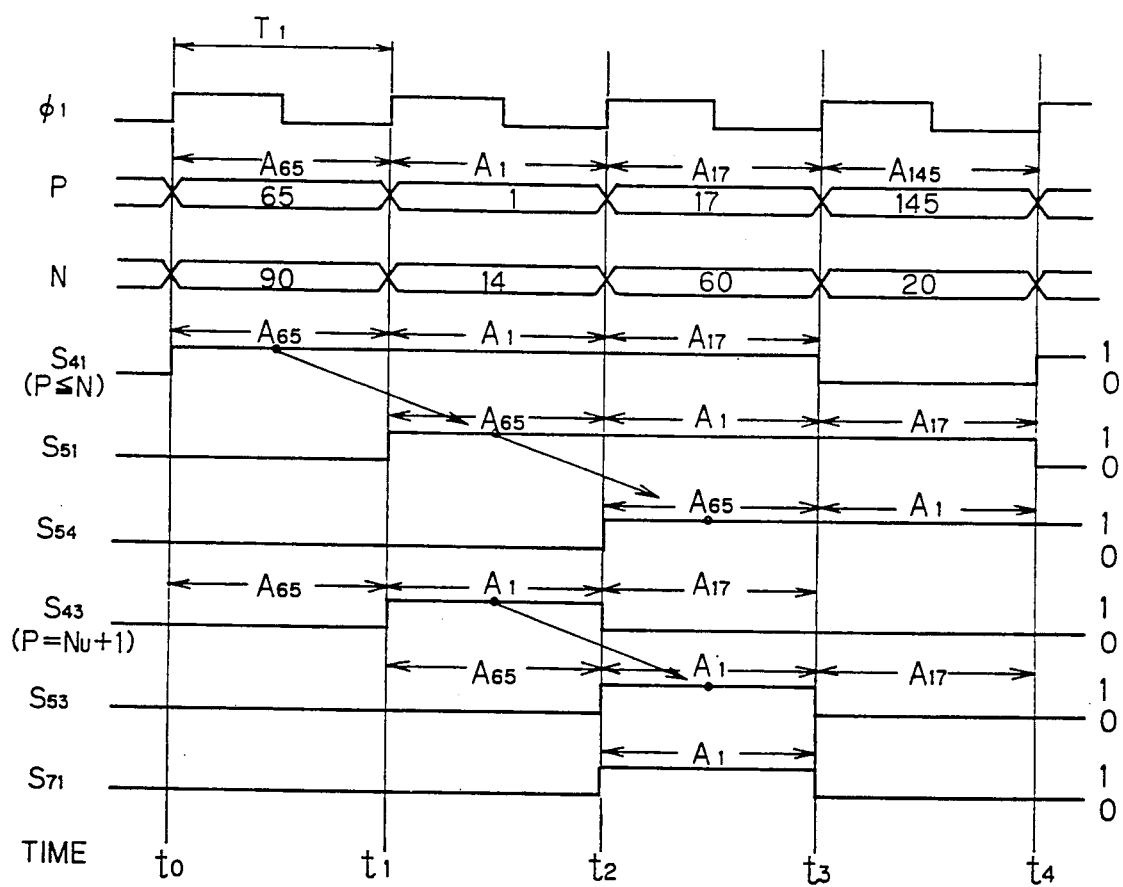

FIG. 14 is a timing chart showing the judging operation of the divisional exposure conditions performed by the AND gate 71. The figure is related to processing executed on the column of the elementary areas including the elementary area $A_1$ shown in FIG. 3. Referring to FIG. 14, the screen pattern data P and the image data N relating to respective elementary areas are inputted within a cycle $T_1$, in synchronism with the leading edge of the first clock signal $\phi_1$. That is, the image data N and the screen pattern data P are inputted with respect to an elementary area $A_{65}$ during an interval between times $t_0$ and $t_1$, with respect to the elementary area $A_1$ during an interval between times $t_1$ and $t_2$, with respect to an elementary area $A_{17}$ during an interval between times $t_2$ and $t_3$ and with respect to an elementary area $A_{145}$ during an interval between times $t_3$ and $t_4$, respectively.

The output signal $S_{41}$ from the comparator 41 becomes a "1" when $P \leq N$, and a "0" when $N < P$. In the example shown in FIG. 14, therefore, the signal $S_{41}$ is at a "1" level with respect to the elementary areas $A_{65}$, $A_1$ and $A_{17}$.

The signal $S_{51}$ is delayed by the period $T_1$ from the signal $S_{41}$, and the signal $S_{54}$ is further delayed by $T_1$ from the signal $S_{51}$.

The output signal $S_{43}$ from the comparator 43 becomes a "1" level when $P = N_u + 1$. The relation between the screen pattern data P and $(N_u + 1)$ is shown in the lower part of FIG. 14, where $P = N_u + 1$ holds only when $P = 1$ and $N = 14$. Therefore, the signal $S_{43}$ is at a "1" level with respect to the elementary area $A_1$ during the interval between the times $t_1$ and $t_2$. The output signal $S_{53}$ from the flip-flop 53, which is delayed by one cycle $T_1$ from the signal $S_{43}$, becomes a "1" level during the interval between the times $t_2$ and $t_3$.

The output signal $S_{42}$ from the comparator 42, which signal is not shown in FIG. 14, is maintained at a "0" level during the interval between the times $t_0$ and $t_4$ since the image data N are not more than 240. Thus, the inverted signal $\overline{S_{52}}$ of the output from the flip-flop 52 is maintained at a "1" level.

These signals $\overline{S_{52}}$, $S_{53}$ and $S_{54}$ are inputted in the AND gate 71, whose output signal $S_{71}$ attains a "1" level only during the interval between the times $t_2$ and $t_3$. In other words, the signal $S_{71}$ is at a "1" level since the divisional exposure condition C-1a expressed by the above equation (13) holds for the elementary area $A_1$. It is to be noted that $A_m = A_1$ and $A_{m-1} = A_{65}$ in the equation (13).

Operation of the AND gates 72 and 73 for detecting divisional exposure areas is similar to the timing chart shown in FIG. 14, and hence a detailed description thereof is omitted.

The signals $S_{71}$ to $S_{73}$ thus obtained are inverted in the inverters 61 to 63 shown in FIG. 11B, respectively, and supplied to a four-input AND gate 91. The output signal $S_{51}$ from the flip-flop 51 is also supplied to the four-input AND gate 91. Therefore, an output signal $S_{91}$ from the four-input AND gate 91 is "1" only when the elementary area $A_m$ satisfies the exposure condition of the equation (10) while satisfying none of the divisional exposure conditions of the equations (13) to (15). In other words, the signal $S_{91}$ becomes a "1" when the elementary area $A_m$ is entirely exposed. This signal $S_{91}$ is supplied to the AOM 8 as an exposure output signal S through a four-input OR gate 92.

On the other hand, a first signal generator 81 for generating the divisional exposure signal shown in FIG. 11B receives the output signal $S_{71}$, the LSBD $N_1$, a second clock signal $\phi_2$ and a clear signal $S_{32}$ from a clear output circuit 32. The second clock signal $\phi_2$ is a clock signal which is synchronous with the first clock signal $\phi_1$ and has a frequency 16 times that of the first clock signal $\phi_1$. The clear signal generator 32 is adapted to generate the clear signal $S_{32}$ which is necessary for operation of the first signal generator 81, as described later in detail.

Similarly, a second signal generator 82 receives the output signal $S_{72}$, the LSBD $N_1$, the second clock signal $\phi_2$ and the clear signal $S_{32}$. A third signal generator 83 receives the output signal $S_{73}$, the LSBD $N_1$, the second clock signal $\phi_2$ and the clear signal $S_{32}$.

The first to third signal generators 81 to 83 generate divisional exposure signals $S_{81}$ to $S_{83}$ in accordance with the divisional exposure conditions C-1a, C-1b and C-2 expressed in the above equations (13) to (15), respectively. The divisional exposure signals $S_{81}$ to $S_{83}$ and the signal $S_{91}$ are inputted in the four-input OR gate 92, so that any one which has the signals of "1" level is supplied to the AOM 8 as the exposure signal S.

The internal structure of the signal generators 81 to 83 and the operation of each in accordance with the divisional exposure condition C-1a, C-1b or C-2 will be described in more detail further on.

Figure 13A:
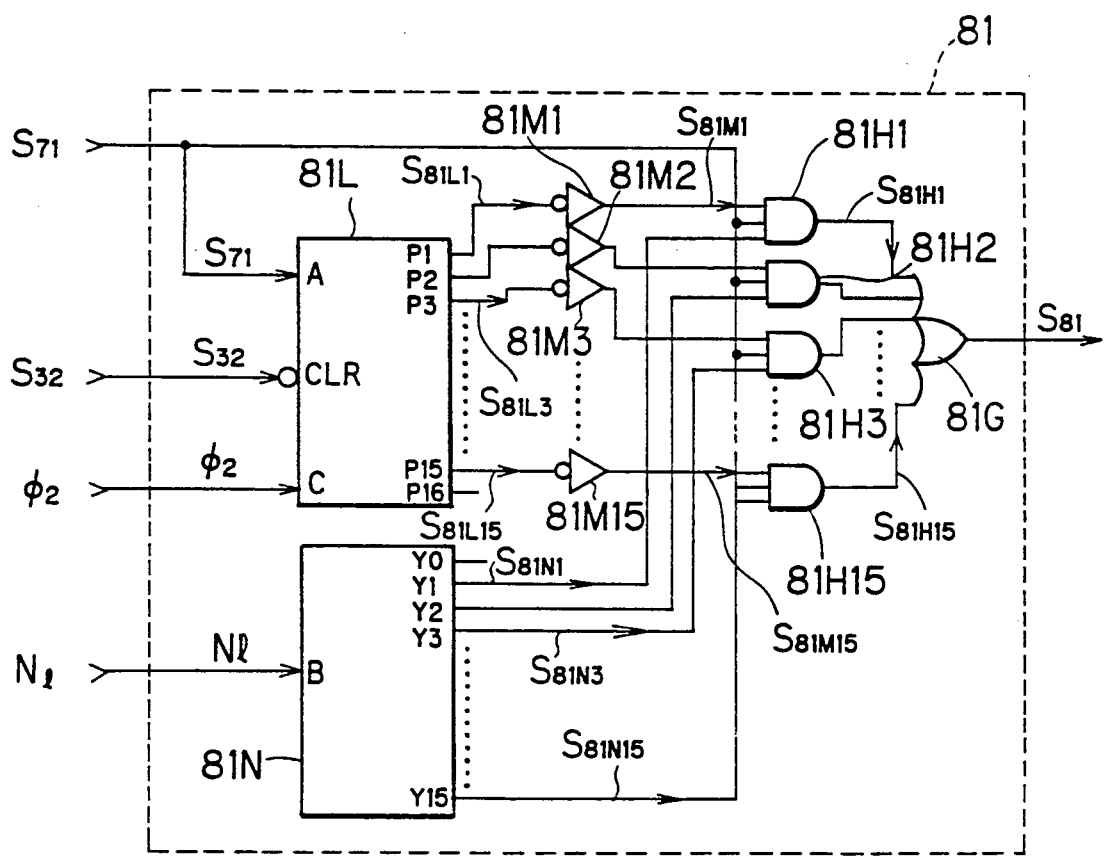
Figure 13B:
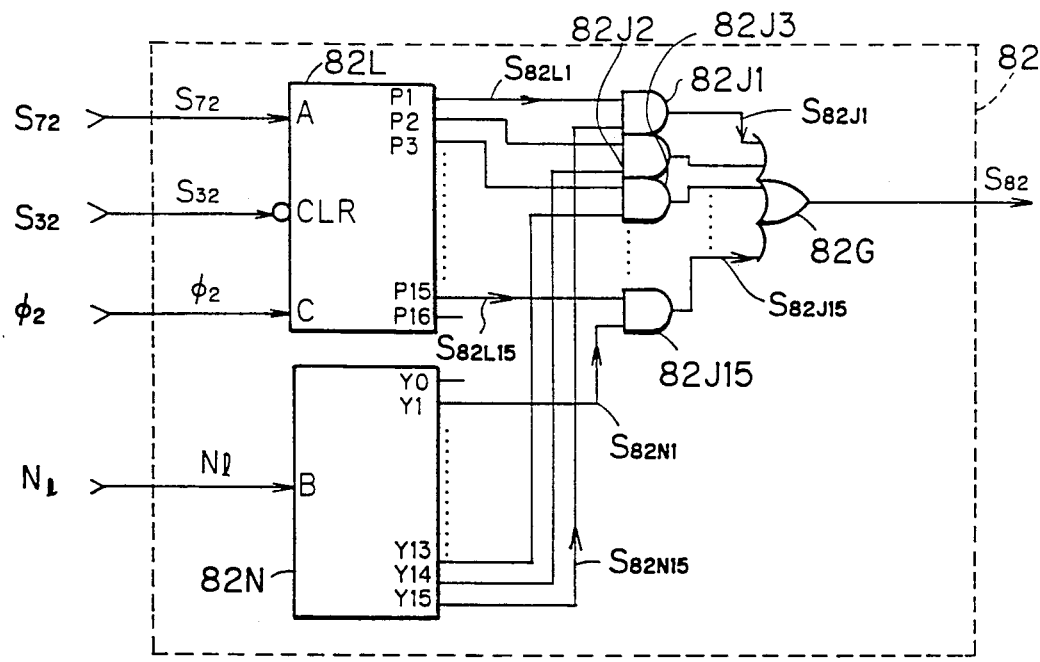
Figure 13C:
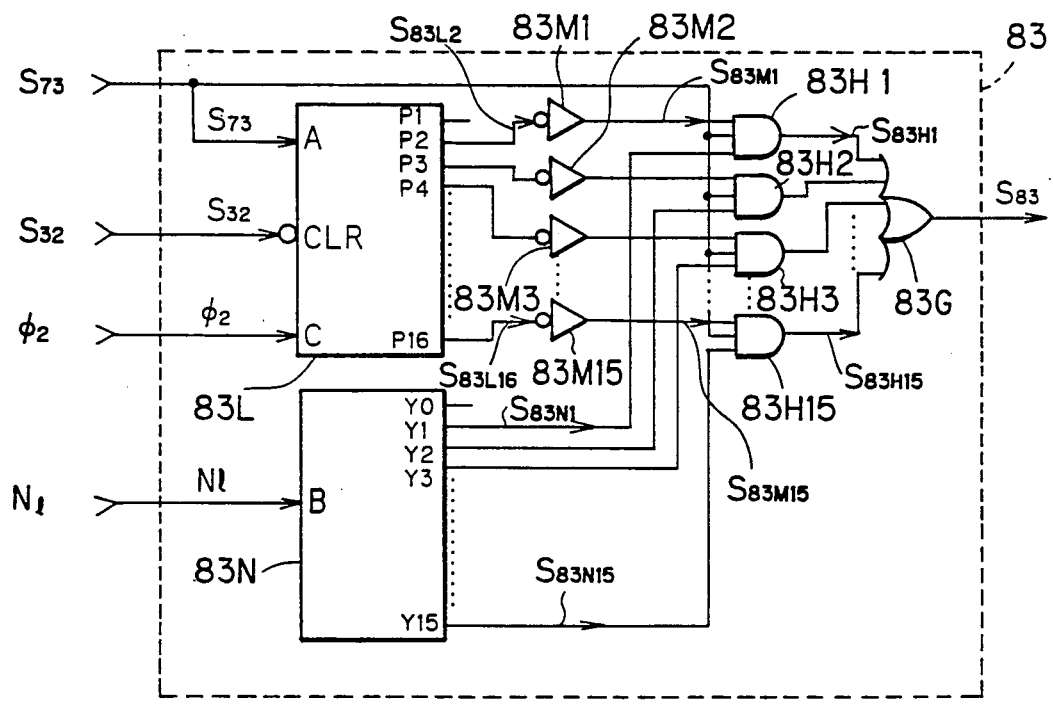

FIGS. 13A to 13C are block diagrams showing the internal structure of the signal generators 81 to 83. Operation of the first signal generator 81 under the divided exposure condition C-1a is now described with reference to a timing chart shown in FIG. 15A.

In the case of the divisional exposure condition C-1a, the AND gate 71 shown in FIG. 11A outputs the signal $S_{71}$ at a "1" level. This signal $S_{71}$ is supplied to an input terminal A of a shift register 81L provided in the first signal generator 81, as shown in FIG. 13A. The shift register 81L, which receives a serial input and sends a parallel output, sequentially receives the signal $S_{71}$ at the input terminal A and output the same at output terminals P1 to P16 as a delay signal which is synchronous with the second clock signal $\phi_2$ received at a input terminal C.

Figure 15A:
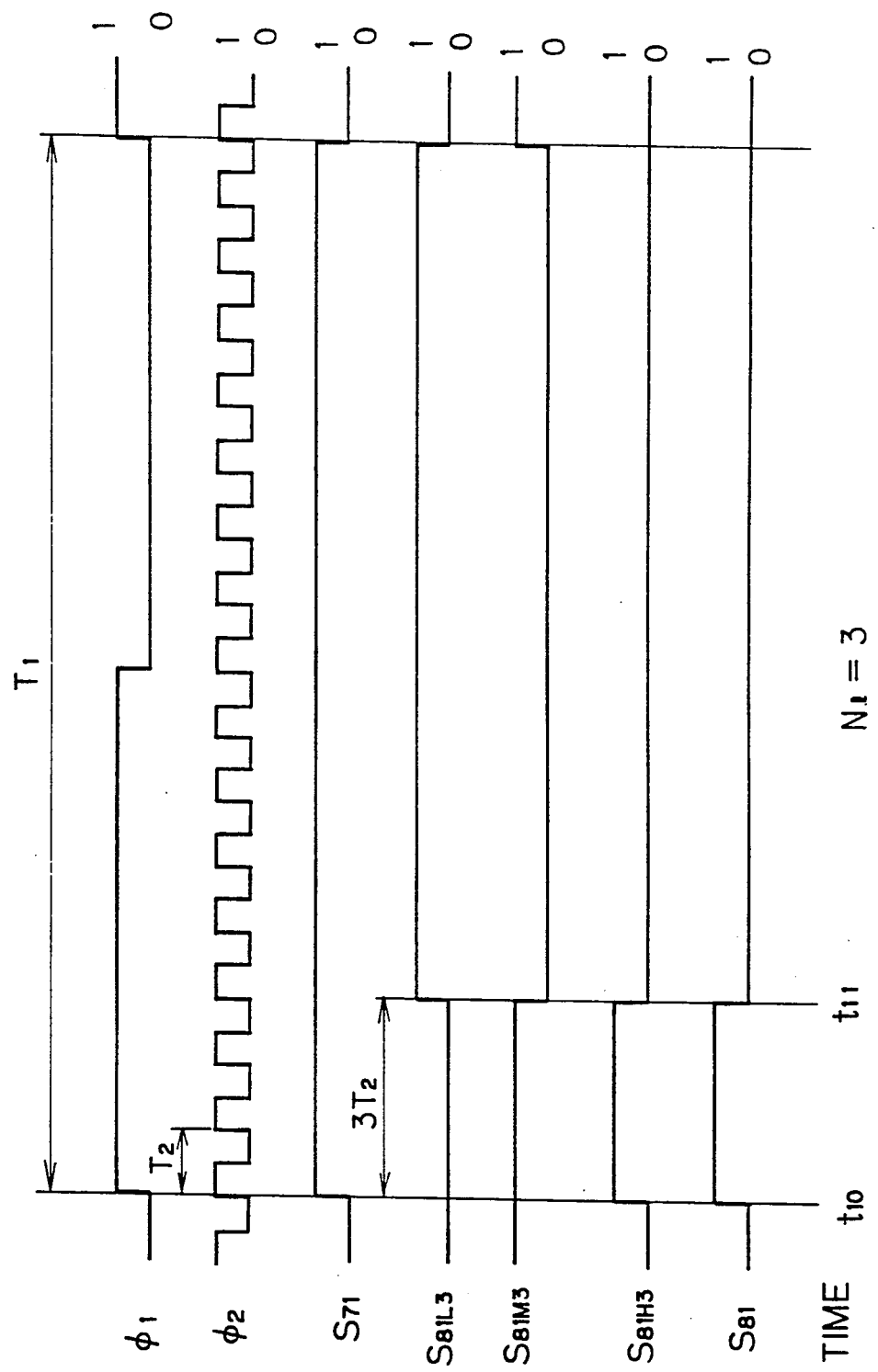

As shown in FIG. 15A, the period $T_2$ of the second clock signal $\phi_2$ is 1/16th of $T_1$ of the first clock signal $\phi_1$. FIG. 15A also shows the relation between the input signal $S_{71}$ and an output signal $S_{81L3}$ at an output terminal P3. Referring to FIG. 15A, the first clock signal $\phi_1$ rises at a time $t_{10}$ and the signal $S_{71}$ simultaneously becomes a "1" level, whereby the signal $S_{81L3}$ at the output terminal P3 becomes a "1" level at a time $t_{11}$ which is delayed by a period of three times $T_2$ ($3T_2$). In other words, output signals $S_{81L1}$ to $S_{81L15}$, which appear at respective output terminals Pn(n=1 to 15) rise in delays by periods of n times $T_2$ from the time $t_{10}$, respectively. The output signals $S_{81L1}$ to $S_{81L15}$ are inverted in inverters 81M1 to 81M15, respectively, to become signals $S_{81M1}$ to $S_{81M15}$. FIG. 15A shows only the signal $S_{81M3}$, as an example of the foregoing.

On the other hand, the LSBD $N_1$ of the image data N are supplied to an input terminal B of a decoder 81N provided in the first signal generator 81. The LSBD $N_1$ are in the form of four-bit binary signals, and only one of signals $S_{81N0}$ to $S_{81N15}$ outputted from respective output terminals Y0 to Y15 attains a "1" level in accordance with the decimal value (0 to 15) of the LSBD $N_1$. When $N_1=3$, for example, only the output signal $S_{81N3}$ attains a "1" level while the other signals remain at a "0" level.

Three-input AND gates 81H1 to 81H15 provided in the first signal generator 81 receive signals $S_{81M1}$ to $S_{81M15}$, respectively, and also signals $S_{81N1}$ to $S_{81N15}$, respectively, while the signal $S_{71}$ is received by all the the three-input AND gates 81H1 to 81H15. Referring to FIG. 15A (showing the case of $N_1=3$), an output signal $S_{81H3}$ of the three-input AND gate 81H3 is at a "1" level during the interval of $3T_2$ between the times $t_{10}$ and $t_{11}$. Output signals (not shown) of the remaining three-input AND gates are maintained at "0" levels. All of the output signals $S_{81H1}$ to $S_{81H15}$ are inputted in a 15-input OR gate 81G, which in turn generates a first divisional exposure signal $S_{81}$.

As hereinabove described, in the case of the divisional exposure condition C-1a, the divisional exposure signal $S_{81}$ is "1" during a period of $N_1$ times $T_2$ in response to the output signal $S_{71}$ of the AND gate 71 and the LSBD $N_1$ inputted in the first signal generator 81.

Since the cycle $T_2$ is 1/16th of the cycle $T_1$, the period of $N_1$ times $T_2$ in which the divisional exposure signal $S_{81}$ is at a "1" level is $N_1/16$ of the cycle $T_1$. Further, the cycle $T_1$ corresponds to the width a of one elementary area. Comparing FIG. 15A with FIG. 9, therefore, it can be understood that the divisional exposure signal $S_{81}$ is an exposure signal S for controlling exposure of $N_1/16$ of the elementary area $A_m$ from the boundary $B_{m-1}$ (or time $t_a$).

The clear signal $S_{32}$ is provided to a clear input terminal CLR of the shift register 81L, to thereby clear the shift register 81L every time the first clock signal $\phi_1$ rises.

Figure 12:
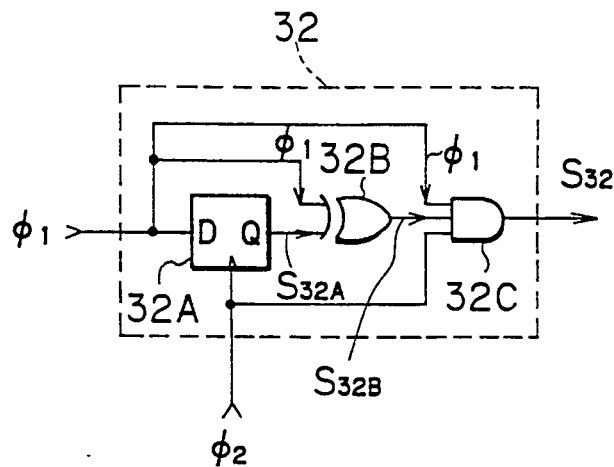

The internal structure of the clear signal generator 32 for generating the clear signal $S_{32}$ is shown in FIG. 12, while its operation is shown in FIG. 16. A flip-flop 32A provided in the clear signal generator 32 latches the value of the first clock signal $\phi_1$ in response to the second clock signal $\phi_2$, to produce a signal $S_{32A}$ which is delayed by $T_2$ from the first clock signal $\phi_1$. This signal $S_{32A}$ and the first clock signal $\phi_1$ are inputted in an exclusive OR gate 32B. An output signal $S_{32B}$ from the exclusive OR gate 32B as well as the first and second clock signals $\phi_1$ and $\phi_2$ are inputted in a three-input AND gate 32C generating an inverted output. As a result, the three-input AND gate 32C outputs the clear signal $S_{32}$, which holds a "0" level during half the cycle $T_2$ every time the first clock signal $\phi_1$ rises, as shown in FIG. 16. When the clear signal $S_{32}$ is inputted in the shift register 81L provided in the first signal generator 81, the shift register 81L is cleared every time the first clock signal $\phi_1$ rises. Thus, the shift register 81L operates to process a new input signal $S_{71}$ at an interval of the cycle $T_1$ of the first clock signal $\phi_1$.

In the case of the divisional exposure condition C-1b, the AND gate 72 shown in FIG. 11A outputs the signal $S_{72}$ at a "1" level. This signal $S_{72}$ is supplied to an input terminal A of a shift register 82L provided in the second signal generator 82 shown in FIG. 13B. The shift register 82L receives a serial input and generates a parallel output, similarly to the shift register 81L. Therefore, it outputs signals $S_{82L1}$ to $S_{82L15}$, which rise with delays of periods $T_2$ to $15T_2$ from the rise time of the signal $S_{72}$, respectively, in synchronism with the second clock signal $\phi_2$ supplied to its input terminal C.

FIG. 15B is a timing chart showing the operation of the second signal generator 82. Referring to FIG. 15B, the signal $S_{82L3}$ rises with a delay of a period $3T_2$ from a rise time $t_{20}$ of the first and second clock signals $\phi_1$ and $\phi_2$, and the output signal $S_{72}$.

A decoder 82N has a function similar to that of the decoder 81N, such that only one of signals $S_{82N1}$ to $S_{82N15}$, which are outputted from its output terminals Y1 to Y15, respectively, attains a "1" level in response to the decimal portion of the LSBD N of the image data N supplied to its input terminal B.

Each of two-input AND gates 82J1 to 82J15 receives a combination of one of the signals $S_{82L1}$ to $S_{82L15}$ and one of signals $S_{82N1}$ to $S_{82N15}$. It is to be noted here that the two-input AND gate 82J1 receives the signals $S_{82L1}$ and $S_{82N15}$ while the two-input AND gate 82J2 receives the signals $S_{82L2}$ and $S_{82N14}$, for example. In other words, output signals $S_{82J1}$, $S_{82J2}$, ..., $S_{82J15}$ of the respective two-input AND gates 82J1 to 82J15 correspond to the output signals $S_{82L15}$, $S_{82L14}$, ..., $S_{82L1}$ of the shift register 82L. Consequently, only one of the output signals $S_{82L1}$ to $S_{82L15}$ of the shift register 82L, the one which is delayed by a period of $(16-N) T_2$ from the signal $S_{72}$, maintains its logic state. The remaining output signals are all brought to "0" levels, when they are outputted from the two-input AND gates 82J1 to 82J15.

All of the output signals $S_{82J1}$ to $S_{82J15}$ from the respective two-input AND gates 82J1 to 82J15 thus obtained are inputted in a 15-input OR gate 82G, which in turn outputs a second divisional exposure signal $S_{82}$.

Referring to FIG. 15B showing the case of $N_1=13$, the divisional exposure signal $S_{82}$ rises at a time $t_{21}$ which is delayed by a period $3T_2$ from the rise time $t_{20}$ of the signal $S_{72}$, since $(16-N_1)=3$.

The shift register 82L is cleared by the clear signal $S_{32}$ received in its clear input terminal CLR every time the first clock signal $\phi_1$ rises, and hence the divisional exposure signal $S_{82}$ is also simultaneously cleared at a time $t_{22}$. Therefore, shown in FIG. 15B, a period during which the divisional exposure signal $S_{82}$ holds "1" level is $N_1$ times $T_2(13T_2)$ in response to the decimal number of the LSBD $N_1$ (=13). The rate of the duration is $N_1/16$ relative to the cycle $T_1$ of the first clock signal $\phi_1$.

It can be, therefore, understood by comparing FIG. 15B with FIG. 9 that the divisional exposure signal $S_{82}$ is an exposure signal S which controls exposure from an intermediate portion of the elementary area $A_m$ to the boundary $B_{m+1}$ between the elementary areas $A_m$ and $A_{m+1}$. It is also understood that the exposed portion is $N_1/16$ of the elementary area $A_m$.

In the case of the divisional exposure condition C-2, the AND gate 73 shown in FIG. 11A outputs the signal $S_{73}$ at a "1" level. This signal $S_{73}$ is supplied to an input terminal A of a shift register 83L provided in the third signal generator 83 shown in FIG. 13C. The shift register 83L is similar to the shift registers 81L and 82L. However, its output terminal P1 is open and signals $S_{82L2}$ to $S_{82L16}$, which are delayed by periods $2T_2$ to $16T_2$, respectively, from the signal $S_{73}$, are outputted in synchronism with the second clock signal $\phi_2$ received in its input terminal C. The signals $S_{82L2}$ to $S_{82L16}$ are inverted in inverters 83M1 to 83M15, respectively, to become signals $S_{83M1}$ to $S_{83M15}$.

Figure 15C:
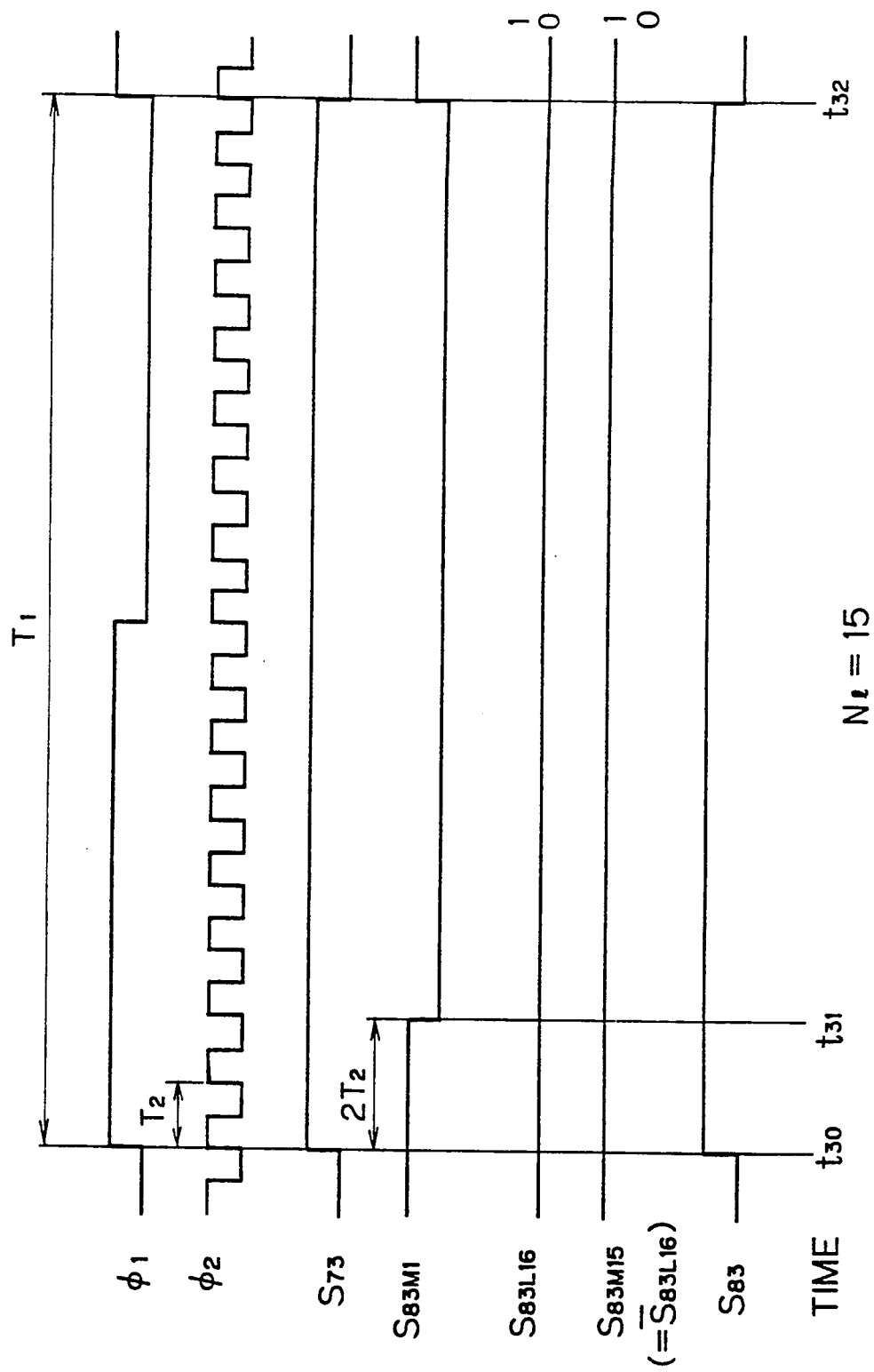

FIG. 15C is a timing chart showing the operation of the third signal generator 83. Referring to FIG. 15C, the trailing end of the signal $S_{83M1}$, which is inverted from the signal $S_{83L2}$, is delayed by a period $2T_2$ from the rise time $t_{30}$ of the first and second clock signals $\phi_1$ and $\phi_2$, and the output signal $S_{73}$. That is, the signal $S_{83M1}$ is maintained at a "1" level during an interval $3T_2$ between times $t_{30}$ and $t_{31}$, and falls to a "0" level at the time $t_{31}$.

FIG. 15C also shows the signal $S_{83L16}$ and its inverted signal $S_{83M15}$. Although the signal $S_{83L16}$ should rise with a delay of a period $16T_2$ from the time $t_{30}$, it is maintained at a "0" level until a time $t_{32}$ for a one cycle $T_1$, duration since $16T_2=T_1$. Therefore, its inverted signal $S_{83M15}$ is maintained at a "1" level during the interval between the times $t_{30}$ and $t_{32}$.

On the other hand, a decoder 83N has a function substantially equal to that of the decoders 81N and 82N, such that only one of signals $S_{83N1}$ to $S_{83N15}$ outputted from respective terminals Y1 to Y15 becomes "1" in response to the LSBD $N_1$ supplied to its input terminal B.

Three-input AND gates 83H1 to 83H15 receive the respective signals $S_{83M1}$ to $S_{83M15}$ and the respective signals $S_{83N1}$ to $S_{83N15}$, while the signal $S_{73}$ is commonly inputted in the three-input AND gates 83H1 to 83H15. All of output signals $S_{83H1}$ to $S_{83H15}$ from the respective three-input AND gates 83H1 to 83H15 are inputted in a 15-input OR gate 83G, which in turn outputs a third divisional exposure signal $S_{83}$.

FIG. 15C shows the divisional exposure signal $S_{83}$ in the case of $N_1=15$. In this case, only $S_{83N15}$ is at a "1" level within the output signals $S_{83N1}$ to $S_{83N15}$ of the decoder 83N, whereby the signal $S_{83M15}$ corresponding thereto is outputted as the divisional exposure signal $S_{83}$ through the three-input AND gate 83H15 and the 15-input OR gate 83G. Since the signal $S_{83M15}$ is maintained at a "1" level as shown in the figure, the divisional exposure signal $S_{83}$ is also maintained at a "1" level throughout an interval between $t_{30}$ and $t_{32}$.

Thus, the third signal generator 83 outputs the divisional exposure signal $S_{83}$ for controlling exposure of $(N_1+1)/16$ of the elementary area $A_m$ in response to the LSBD $N_1$ of the image data N in the third divided exposure condition C-2.

As described above, one of the divisional exposure signals $S_{81}$ to $S_{83}$ is brought to a "1" level in response to each of the divided exposure conditions C-1a, C-1b and C-2. Incidentally, the respective output terminals Y0 of the decoders 81N to 83N are open in order not to expose the elementary area $A_m$ in the case of $N_1=0$. When $N_1=0$, all of the divisional exposure signals $S_{81}$ to $S_{83}$ attain "0" levels because the signals $S_{81N1}$ to $S_{81N15}$, the signals $S_{82N1}$ to $S_{82N15}$ and the signals $S_{83N1}$ to $S_{83N15}$ of the decoders 81N to 83N are all at "0" levels.

When none of the divisional exposure conditions is satisfied, on the other hand, the divisional exposure signals $S_{81}$ to $S_{83}$ are at "0" level since the signals $S_{71}$ to $S_{73}$ are at "0" level.

As described above, the four-input AND gate 91 shown in FIG. 11B receives the signals $\overline{S_{71}}$ to $\overline{S_{73}}$, which are inverted by the inverters 61 to 63 in advance, as well as the output signal $S_{51}$ of the flip-flop 51. Therefore, when none of the divisional exposure conditions is satisfied and the exposure condition of the equation (3) is satisfied, an exposure signal S which causes exposure of the entire elementary area is generated.

As described above, the image recording apparatus of this embodiment judges the exposure condition and the divisional exposure conditions for each elementary area and exposes the same in accordance with the conditions, to thereby form a halftone dot having the same gradation number as the image data N. Further, it is not required to increase the capacity of the screen pattern memory 30 etc. since no data are required other than the image data N and the screen pattern data P in order to generate the divisional exposure signal for controlling the divisional exposure.

The present invention is not restricted to the above embodiment. The following modifications can be attained, for example:

In the above embodiment, a portion of $(N_1+1)/16$ of the unit area $A_{241}$ is exposed in response to the LSBD $N_1$ of the image data N in the case of the divisional exposure condition C-2, whereby the gradation number is increased. However, a similar effect can be attained, for example, by exposing a portion of $N_1/16$ of the elementary area $A_{241}$ when $N_1$ is not more than 14 and exposing the entire elementary area $A_{241}$ when $N_1=15$.

Alternatively, divisional exposure under the divisional exposure condition C-2 may be performed in the same way as the divisional exposure condition C-1 in the above embodiment, while the entire elementary area $A_{241}$ is exposed when the image data N is equal to 255.

The rate of the exposed portion in a divisional exposure area is determined in response to the LSBD $N_1$ of the image data N in the above embodiment. The LSBD $N_1$ can be also expressed in the following equation, by employing the equality in the equation (7) or (8):

$$N_l = N - N_u = N - P + 1 \tag{16}$$

The third term "+1" in the right hand side of the equation (16) appears because the screen pattern data P is formed so as to be suitable for judgement along the equations (7) and (8). In general, therefore, the equality in the equation (7) or (8) and the equation (16) are respectively provided as follows:

$$P = N_u + C_O \tag{17}$$

$$N_l = N - P + C_O \tag{18}$$

In other words, the data $N_l$ for deciding the rate of the divisional exposure are obtained by adding a constant value $C_O$ to a difference between the image data N and the screen pattern data P. When the equations (17) and (18) are employed, the equation (3) is replaced by the following equation (19):

$$P - C_O + 1 < N \tag{19}$$

Therefore, it can be said that, generally in divisional exposure, only a portion which is responsive to a difference between the image data N and the screen pattern data P of an elementary area is exposed.

The range of the image data N for which the equation (17) holds for a certain value of the screen pattern data P is provided as follows:

$$P - C_0 \leq N < P + C_0 + \Delta P \tag{20}$$

where $\Delta P$ represents the number of gradation levels ($\Delta P = 16$ in the above embodiment) between two adjacent screen pattern data P. In other words, as to judgement of the divisional exposure condition for each elementary area, the elementary area can be assumed to be divisionally exposed when the image data N are in a certain range, which is expressed by the equation (20) for example, predetermined on the basis of the screen pattern data P.

In the above embodiment, the halftone dot HD is assumed to be formed of 4×4 elementary areas. However, the present invention is also applicable to a halftone dot which is divided into 5×5, 8×8, 16×16 or the like. When one halftone dot HD is formed of 5×5 elementary areas, for example, each elementary area can be further divided by 11 for performing the divisional exposure. In this case, a useable gradation number is 275 (=5×5×11). Accordingly, the image data N are converted to be expressed in 275 gradation levels. As can be seen from the above example, the number of elementary areas forming the halftone dot HD and the dividing number of each elementary area can be arbitrary selected. In this case, the rate of exposed portion in divisional exposure is not necessarily decided on the basis of the LSBD $N_l$ of the image data N, but is determined in response to the difference between the image data N and the screen pattern data P, similarly to the above embodiment.

However, when the number of elementary areas forming the halftone dot HD and the dividing number of each elementary area are expressed as $2^m$ and $2^n$ (m, n are integers), respectively, as is the case with the above embodiment, processing with a binary signal is facilitated.

When a preceding elementary area along a scanning line is exposed, the portion of the divisional exposure is formed to contact the preceding elementary area in the above embodiment. However the portion may be formed to be closer to the center of the halftone dot. The "center of the halftone dot" denotes, in FIG. 1 or 3, a line along the subscanning (horizontal) direction located at the center of the main scanning (vertical) direction of the halftone dot HD, for example. Through the divisinal exposure, exposed portions of all elementary areas $A_1$ to $A_{241}$ are concentrated to the center of the halftone dot HD, which dot is therefore formed with an excellent configuration.

According to the present invention, as described above, the elementary area to be divisionally exposed is designated on the basis of the image data and the screen pattern data while the elementary area is partially exposed on the basis of the difference between those data. As a result, reproducibility of gradation levels of a recording image can be substantially increased to the same extent as the image signal without reducing the ratio of the diameter of the optical exposure beam to the screen pitch and without increasing the capacity of the screen pattern memory.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method of producing a halftone image formed by a plurality of halftone dots on a photosensitive material in which each full region of one halftone dot is divided into a plurality of unit areas, the method comprising the steps of:
   (a) providing a respective image datum which defines a density for each unit area on an image plane,
   (b) providing a respective threshold datum for each unit area on said image plane,
   (c) carrying out a single comparison of said image datum against said threshold datum for each unit area on said image plane, and designating, on the basis of said comparison, each unit area as either a full-exposure area to be fully exposed, as a semi-exposure area to be partially exposed or as a non-exposed area not to be exposed, and
   (d) exposing unit areas on said photosensitive material corresponding to said full-exposure area and said semi-exposure area on said image plane to produce said halftone image, where a ratio of an exposed portion in said semi-exposure area to the entirety of one unit area is determined on the basis of a magnitude difference between said image datum and said threshold datum for said semi-exposure area.

2. A method in accordance with claim 1, wherein said photosensitive material is exposed with a light beam which scans said halftone image at a prescribed speed, and a size of said exposed portion in said semi-exposure area is controlled by adjusting the duration of an exposure time in said semi-exposure area in proportion to said ratio.

3. A method in accordance with claim 2, wherein said threshold datum has a value which is part of a set of threshold values assigned for respective unit areas included in said full region, where said threshold values are arranged in an arithmetic sequence of numbers having a prescribed numberical interval.

4. A method in accordance with claim 3, wherein each of said image data and said threshold data is a digital data having a same number of bits.

5. A method in accordance with claim 4, wherein said step (c) further comprises the steps of:
(c-1) finding the larger of said image data and said threshold data and defining thereby said unit area as either said non-exposure area or as an exposure area to be exposed,
(c-2) finding a value which substantially expresses said difference between said image data and said threshold data for each unit area, and
(c-3) designating said exposure area as said full-exposure area when said difference is out of a prescribed range, or as said semi-exposure area when said difference is within said prescribed range.

6. A method in accordance with claim 5, wherein said exposed portion of said semi-exposure area extends to a boundary between said semi-exposure area and a neighbor unit area neighboring said semi-exposure area, where said neighbor unit area corresponds to said exposure area.

7. An apparatus for producing a halftone image formed of a plurality of halftone dots on a photosensitive material on the basis of image data expressing density for each unit area on an image plane, in which a full region of one halftone dot is divided into a plurality of unit areas, said apparatus comprising:
(a) first means for storing a previously prepared, respective threshold datum for each unit area on said image plane,
(b) second means for effecting a single comparison of said image data against said respective threshold datum for each unit area, and for generating thereby a designation signal designating each unit area as either a full-exposure area to be entirely exposed, as a semi-exposure area to be partially exposed or as a non-exposure area not to be exposed,
(c) third means for generating a magnitude difference signal expressing a magnitude difference between said image data and said respective threshold datum for each unit area,
(d) fourth means for generating an exposure signal defining an exposure time for each unit area, said exposure time being determined on the basis of said designation signal and said magnitude difference signal, and
(e) fifth means for exposing said photosensitive material according to said exposure signal with a light beam which scans said halftone image at a prescribed speed.

8. An apparatus in accordance with claim 7, wherein said threshold datum has a value which is part of a set of threshold values assigned for respective unit areas included in said full region of one halftone dot, where said threshold values are arranged into an arithmetic sequence of numbers having a prescribed numerically defined interval.

9. An apparatus in accordance with claim 8, wherein each of said image data and said threshold data is a digital data having a same number of bits.

10. An apparatus in accordance with claim 9, wherein said second means further comprises:
(b-1) means for finding the larger of said image data and said threshold data and for producing thereby a first signal designating said unit area as said non-exposure area or as an exposure area to be exposed,
(b-2) means for finding a value which substantially expresses said difference between said image data and said threshold data for each unit area, and thereby generating a second signal specifying whether or not said difference is within a prescribed range,
(b-3) means for generating said designation signal on the basis of said first and second signals, where said designation signal designates said exposure area as said full-exposure area when said difference is outside said prescribed range, or as said semi-exposure area when said difference is within said prescribed range.

11. An apparatus in accordance with claim 10, wherein
said second means further comprises: (b-4) means for finding a neighbor unit area neighboring said semi-exposure area, said neighbor unit area corresponding to said exposure area, and thereby generating a third signal substantially specifying a boundary between said semi-exposure area and said neighbor unit area, and
said generating means being effective to generate said designation signal further specifying the location of an exposed portion of said semi-exposure area so that said exposed portion extends to said boundary.

12. A method for producing halftone dots of an image wherein each halftone dot is comprised of a plurality of unit areas, the method comprising:
providing image data indicative of the density of the image at each unit area, the image data including a respective image datum at each unit area comprising a first and a second data portion, each said data portion having a corresponding value associated therewith;
providing a respective threshold datum for each unit area; and
carrying out a single comparison of said respective image datum to said threshold datum for each unit area and on the basis of said comparison proceeding by either:
(a) exposing the entirety of said unit area; or
(b) exposing none of said unit area; or
(c) exposing only a portion of said unit area, wherein the degree of said partial exposure of said unit area is determined by reference to the value of said second data portion of said image data.

13. The method of claim 12, wherein said second data portion of said image data is generated by obtaining the magnitude difference between said image data and said threshold datum.

14. The method of claim 12, wherein the exposing of said unit areas is carried out by means of a beam which is deployed for exposing a photosensitive material and wherein the exposure of said unit areas is carried out by controlling the time period during the exposure of each unit area at which said beam remains turned on.

15. The method of claim 12, wherein said first image data portion is selected and set to have a predetermined relationship with said threshold data and wherein said comparison is carried out on the basis of the value of said first portion of said image data.

16. The method of claim 12, wherein said image datum for each unit area is comprised of a plurality of bits including $N_u$ more significant bits and $N_l$ less significant bits, where $N_u$ and $N_l$ are positive integers; and wherein said threshold datum is comprised of $N_u + N_l$ bits for each unit area, and further wherein said second image data portion is comprised of said $N_l$ bits.

17. The method of claim 16, wherein said step of providing threshold data includes the steps of:

assigning different values to said more significant $N_u$ bits in respective threshold data for said plurality of unit areas; and assigning same values to said less significant $N_l$ bits in respective threshold data for said plurality of unit areas.

* * * * *